(12) United States Patent
Bradbury et al.

(10) Patent No.: US 12,198,047 B2
(45) Date of Patent: Jan. 14, 2025

(54) QUASI-RECURRENT NEURAL NETWORK BASED ENCODER-DECODER MODEL

(71) Applicant: Salesforce.com, inc., San Francisco, CA (US)

(72) Inventors: James Bradbury, San Francisco, CA (US); Stephen Joseph Merity, San Francisco, CA (US); Caiming Xiong, Palo Alto, CA (US); Richard Socher, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 1011 days.

(21) Appl. No.: 17/122,894

(22) Filed: Dec. 15, 2020

(65) Prior Publication Data

US 2021/0103816 A1   Apr. 8, 2021

Related U.S. Application Data

(63) Continuation of application No. 15/420,801, filed on Jan. 31, 2017, now Pat. No. 11,080,595.

(Continued)

(51) Int. Cl.
| | |
|---|---|
| *G06N 3/08* | (2023.01) |
| *G06F 17/16* | (2006.01) |
| *G06F 40/00* | (2020.01) |
| *G06F 40/216* | (2020.01) |
| *G06F 40/30* | (2020.01) |

(Continued)

(52) U.S. Cl.
CPC .............. *G06N 3/08* (2013.01); *G06F 17/16* (2013.01); *G06F 40/216* (2020.01); *G06F 40/30* (2020.01); *G06F 40/44* (2020.01); *G06N 3/04* (2013.01); *G06N 3/044* (2023.01); *G06N 3/045* (2023.01); *G06N 3/10* (2013.01); *G06F 40/00* (2020.01); *G10L 15/16* (2013.01); *G10L 15/18* (2013.01); *G10L 15/1815* (2013.01); *G10L 25/30* (2013.01)

(58) Field of Classification Search
CPC .. G06N 3/04; G06N 3/08; G06N 3/10; G06N 3/044; G06N 3/045; G06F 17/16; G06F 40/00; G06F 40/30; G06F 40/44; G06F 40/216; G10L 15/16; G10L 15/18; G10L 15/1815; G10L 25/30
See application file for complete search history.

(56) References Cited

U.S. PATENT DOCUMENTS

| | | | |
|---|---|---|---|
| 6,128,606 | A | 10/2000 | Bengio et al. |
| 10,282,663 | B2 | 5/2019 | Socher et al. |

(Continued)

FOREIGN PATENT DOCUMENTS

| | | |
|---|---|---|
| CN | 1674153 A | 9/2005 |
| CN | 105868829 A | 8/2016 |

(Continued)

OTHER PUBLICATIONS

Examiner's Report for Canadian Application No. 3,040,153 dated Feb. 22, 2021, 4 pages.

(Continued)

*Primary Examiner* — Andrew L Tank
(74) *Attorney, Agent, or Firm* — Haynes and Boone, LLP

(57) ABSTRACT

The technology disclosed provides a quasi-recurrent neural network (QRNN) encoder-decoder model that alternates convolutional layers, which apply in parallel across timesteps, and minimalist recurrent pooling layers that apply in parallel across feature dimensions.

20 Claims, 15 Drawing Sheets

QRNN Encoder-Decoder Model

Related U.S. Application Data

(60) Provisional application No. 62/417,333, filed on Nov. 4, 2016, provisional application No. 62/418,075, filed on Nov. 4, 2016.

(51) Int. Cl.
| | |
|---|---|
| G06F 40/44 | (2020.01) |
| G06N 3/04 | (2023.01) |
| G06N 3/044 | (2023.01) |
| G06N 3/045 | (2023.01) |
| G06N 3/10 | (2006.01) |
| G10L 15/16 | (2006.01) |
| G10L 15/18 | (2013.01) |
| G10L 25/30 | (2013.01) |

(56) References Cited

U.S. PATENT DOCUMENTS

| | | |
|---|---|---|
| 10,346,721 B2 | 7/2019 | Albright et al. |
| 2002/0038294 A1 | 3/2002 | Matsugu |
| 2011/0218950 A1 | 9/2011 | Mirowski et al. |
| 2014/0079297 A1 | 3/2014 | Tadayon et al. |
| 2014/0229164 A1 | 8/2014 | Martens et al. |
| 2016/0099010 A1 | 4/2016 | Sainath et al. |
| 2016/0180215 A1 | 6/2016 | Vinyals et al. |
| 2016/0321784 A1 | 11/2016 | Annapureddy |
| 2016/0350653 A1 | 12/2016 | Socher et al. |
| 2017/0024645 A1 | 1/2017 | Socher et al. |
| 2017/0032280 A1 | 2/2017 | Socher |
| 2018/0129931 A1 | 5/2018 | Bradbury et al. |

FOREIGN PATENT DOCUMENTS

| | | |
|---|---|---|
| WO | 2016160237 A1 | 10/2016 |
| WO | 2018085724 A1 | 5/2018 |

OTHER PUBLICATIONS

Povey, D., et al., "Parallel training of DNNs with natural gradient and parameter averaging", 2014, arXiv:1410.7455, <URL: https://arxiv.org/pdf/1410.7455.pdf>, 28 pages.

James Bradbury et al: "Quasi-Recurrent Neural Networks", arxiv. org, Cornell University Library, 201 Olin Library Cornell University Ithaca, NY 14853, Nov. 5, 2016 (Nov. 5, 2016), XP080729557.

Bahdanau et al., "Neural Machine Translation by Jointly Learning to Align and Translate," Published as a conference paper at International Conference on Learning Representations (ICLR) 2015 (May 19, 2016) pp. 1.15 arXiv:1409.0473v7.

Balduzzi et al., Strongly-Typed Recurrent Neural Networks, Proceedings of the 33rd International Conference on Machine Learning, JMLR: W&CP, vol. 48 (May 24, 2016) pp. 1-10 arxiv.org/abs/1602.02218v2.

Bradbury et al., "MetaMind Neural Machine Translation System for WMT 2016," Proceedings of the First Conference on Machine Translation, vol. 2: Shared Task Papers, pp. 264-267, Berlin, Germany (Aug. 11-12, 2016) pp. 1-4, http://www.aclweb.org/anthology/W16-2308.

Cho et al., "Learning Phrase Representations using RNN Encoder-Decoder for Statistical Machine Translation," Conference on Empirical Methods in Natural Language Processing (Sep. 3, 2014) pp. 1-15 arXiv:1406.1078v3.

Chopra et al., "Abstractive Sentence Summarization with Attentive Recurrent Neural Networks," Proceedings of NAACL-HLT 2016, Conference of the North American Chapter of the Association for Computational Linguistics: Human Language Technologies, (Jun. 12-17, 2016) pp. 1-6 www.aclweb.org/anthology/N16-1012.

Chung et al., "Gated Feedback Recurrent Neural Networks" (Nov. 17, 2015) pp. 1-9 efarXiv:1502.02367v4.

Gal et al., "A Theoretically Grounded Application of Dropout in Recurrent Neural Networks," 30th Conference on Neural Information Processing Systems (NIPS 2016), Barcelona, Spain. (Jan. 1, 2016) pp. 1-9 arxiv.org/abs/1512.05287.

Greff et al., "LSTM: A Search Space Odyssey," IEEE Transactions on Neural Networks and Learning Systems, vol. 28, Issue: 10 (Oct. 10, 2017) pp. 2222-2232 pp. 1-12 arXiv:1503.04069v2.

Hochreiter et al., "Long Short-Term Memory," Neural Computation 9(8) (Jan. 1, 1997) pp. 1735-1780 pp. 1-32 www7.informatik.tu-muenchen.de/~hochreit.

Huang et al., "Densely Connected Convolutional Networks" (Jan. 28, 2018) pp. 1-9, arXiv:1608.06993v5.

Johnson et al., "Effective Use of Word Order for Text Categorization with Convolutional Neural Networks," to appear in North American Chapter of the Association for Computational Linguistics HLT 2015 (Mar. 26, 2015) pp. 1-10 arXiv:1412.1058.

Kalchbrenner et al., "Neural Machine Translation in Linear Time" Google Deepmind, London UK (Mar. 15, 2017) pp. 1-9 arXiv:1610.10099.

Kim et al., "Character-Aware Neural Language Models," Proceedings of the Thirtieth AAAI Conference on Artificial Intelligence (AAAI-16), Association for the Advancement of Artificial Intelligence (Dec. 1, 2015) pp. 2741-2749 pp. 1-9 arXiv:1508.06615.

Kingma et al., "Adam: A Method for Stochastic Optimization," Published as a conference paper at International Conference on Learning Representations (ICLR) (Jan. 30, 2017) pp. 1-15 arXiv:1412.6980.

Krizhevsky et al., "ImageNet Classification with Deep Convolutional Neural Networks," Conference on Neural Information Processing Systems (Jan. 1, 2012) pp. 1-9 http://papers.nips.cc/paper/4824-imagenet-classification-with-deep-convolutional-neural-networks.pdf.

Krueger et al., "Zoneout: Regularizing RNNs by Randomly Preserving Hidden Activations," Under review as a conference paper at International Conference on Learning Representations (ICLR) 2017 (Sep. 22, 2017) pp. 1-11 arXiv:1606.01305v4.

Kumar et al. "Ask Me Anything: Dynamic Memory Networks for Natural Language Processing," firstname@metamind.io, MetaMind, Palo Alto, CA USA (Mar. 5, 2016) pp. 1-10 arXiv:1506.07285v5.

Lee et al., "Fully Character-Level Neural Machine Translation Without Explicit Segmentation," Transactions of the Association for Computational Linguistics (TACL) 2017 (Jun. 13, 2017) pp. 1-13 arXiv:1610.03017v3.

Longpre et al., "A Way Out of the Odyssey: Analyzing and Combining Recent Insights for LSTMS," Under review as a conference paper at International Conference on Learning Representations (ICLR) 2017 (Dec. 17, 2016) pp. 1-10 arXiv:1611.05104v2.

Luong et al., "Effective Approaches to Attention-Based Neural Machine Translation," Proceedings of the 2015 Conference on Empirical Methods in Natural Language Processing, Lisbon, Portugal. (Sep. 20, 2015) pp. 1-11 arXiv:1508.04025.

Maas et al., "Multi-Dimensional Sentiment Analysis with Learned Representations" Technical Report (2011) pp. 1-10.

Merity et al., "Pointer Sentinel Mixture Models," MetaMind—A Salesforce Company, Palo Alto, CA (Sep. 26, 2016) pp. 1-13 arXiv:1609.07843.

Mesnil et al., "Ensemble of Generative and Discriminative Techniques for Sentiment Analysis of Movie Reviews" Accepted as a workshop contribution at International Conference on Learning Representations (ICLR) 2015 (May 27, 2015) pp. 1-5 arXiv:1412.5335.

Mikolov et al., "Recurrent Neural Network Based Language Model," Conference: INTERSPEECH 2010, 11th Annual Conference of the International Speech Communication Association, (Jul. 20, 2010) pp. 1-25 https://www.researchgate.net/publication/221489926_Recurrent_neural_network_based_language_model Jul. 20, 2010.

Miyato et al., "Adversarial Training Methods for Semi-Supervised Text Classification," Published as a conference paper at ICLR 2017, NIPS 2016, Deep Learning Symposium recommendation readers (May 6, 2017) pp. 1-11 arXiv:1605.07725.

Nallapati et al., "Abstractive Text Summarization Using Sequence-to-Sequence RNNs and Beyond," Proceedings of the 20th SIGNLL Conference on Computational Natural Language Learning (Aug. 26, 2016) pp. 1-12 SecarXiv:1602.06023v5.

(56) References Cited

OTHER PUBLICATIONS

Pennington et al., "GloVe: Global Vectors for Word Representation", Proceedings of the 2014 Conference on Empirical Methods in Natural Language Processing (EMNLP), Doha, Qatar (Oct. 25-29, 2014) pp. 1532-1543, pp. 1-12 https://nlp.stanford.edu/pubs/glove.pdf.
Ranzato et al., Sequence Level Training With Recurrent Neural Networks, Published as a Conference Paper at International Conference on Learning Representations (ICLR) 2016, (May 6, 2016) pp. 1-16 arXiv:1511.06732.
Tieleman et al. "Lecture 6.5-RMSProp: Divide the gradient by a running average of its recent magnitude," Coursera: Neural Networks for Machine Learning (Jan. 1, 2012) pp. 1-4.
Tokui et al., "Chainer: A Next-Generation Open Source Framework for Deep Learning," Preferred Networks America. San Mateo, CA. (Jan. 1, 2015) pp. 1-6 hido@preferred.jp.
Van den Oord et al., "Pixel Recurrent Neural Networks," JMLR: W&CP, vol. 48, Proceedings of the 33rd International Conference on Machine, New York, NY (Aug. 19, 2016) pp. 1-11 arXiv:1601.06759.
Wang et al., "Baselines and Bigrams: Simple, Good Sentiment and Topic Classification," Proceedings of the 50th Annual Meeting of the Association for Computational Linguistics, pp. 90-94, pp. 1-5 http://www.aclweb.org/anthology/P12-2018.
Wang et al., "Predicting Polarities of Tweets by Composing Word Embeddings with Long Short-Term Memory," Proceedings of the 53rd Annual Meeting of the Association for Computational Linguistics and the 7th International Joint Conference on Natural Language Processing, pp. 1343-1353, (Jul. 26, 2015) pp. 1-11 www.aclweb.org/anthology/P15-1130.
Wiseman et al., "Sequence-to-Sequence Learning as Beam-Search Optimization," 2016 Conference on Empirical Methods in Natural Language Processing (Nov. 10, 2016) pp. 1-11 arXiv:1606.02960.
Wu et al., "Google's Neural Machine Translation System: Bridging the Gap Between Human and Machine Translation," arXiv preprint arXiv:1609.08144, pp. 1-23 (Oct. 8, 2016).
Xiao et al., "Efficient Character-level Document Classification by Combining Convolution and Recurrent Layers," (Feb. 1, 2016) pp. 1-10 arXiv:1602.00367.
Xiong et al., "Dynamic Memory Networks for Visual and Textual Question Answering," Proceedings of the 33rd International Conference on Machine Learning, New York, NY, USA, JMLR: W&CP vol. 48, (Mar. 4, 2016) pp. 1-10 arXiv:1603.01417.
Zaremba et al., "Recurrent Neural Network Regularization," Under review as a conference paper at International Conference on Learning Representations (ICLR) 2015 (Feb. 19, 2015) pp. 1-8 arXiv:1409.2329.
Zhang et al., "Character-level Convolutional Networks for Text Classification," Conference on Neural Information Processing Systems (Sep. 4, 2015) pp. 1-9 arXiv:1509.01626.
Zhou et al., "A C-LSTM Neural Network for Text Classification" (Nov. 30, 2015) pp. 1-11 arXiv:1511.08630v2.
International Search Report issued by ISA/EP for PCT/US2017/060051 on Jan. 26, 2018; pp. 1-4.
Written Opinion of the International Searching Authority issued by ISA/EP for PCT/US2017/060051 on Jan. 26, 2018; pp. 1-8.
International Search Report issued by ISA/EP for International Application No. PCT/US2017/060049 on Jan. 31, 2018; pp. 1-3.
Written Opinion of the International Searching Authority issued by ISA/EP for PCT/US2017/060049 on Jan. 31, 2018; pp. 1-8.
International Preliminary Report on Patentability for PCT/US2017/060049, dated May 7, 2019, pp. 1-9.
International Preliminary Report on Patentability for PCT/US2017/060051, dated May 7, 2019, pp. 1-9.
Chrupala et al., "Learning Language through Pictures," arXiv:1506.03694v2, Jun. 19, 2015, pp. 1-10.
Examination Report from Australian Patent Application No. 2017355537, Feb. 10, 2020, pp. 1-5.
Graves et al., "Speech Recognition with Deep Recurrent Neural Networks," IEEE, 2013, pp. 6645-6649.
Kalchbrenner, A Convolutional Neural Network for Modeling Sentences, arXiv:1404.2188v1, Apr. 8, 2014, pp. 1-11.
Karpathy et al., "Large-scale Video Classification with Convolutional Neural Networks" 2014 IEEE Conference on Computer Vision and Pattern Recognition, pp. 1725-1732, 2014.
Lai et al., "Recurrent Convolutional Neural Networks for Text Classification," Proceedings of the Twenty-Ninth AAAI Conference on Artificial Intelligence, pp. 2267-2273, 2015.
Liu et al., "Parallel Training of Convolutional Neural Networks for Small Sample Learning," IEEE, 2015, pp. 1-6.
Lu et al., "Hierarchical Question-Image Co-Attention for Visual Question Answering," arXiv:1606.00061v3, pp. 1-11, 2016.
Meng et al., "Encoding Source Language with Convolutional Neural Network for Machine Translation," arXiv:1503.01838v5, pp. 1-12, 2015.
Office Action, including English translation, from Japan Patent Application No. 2019-522910, dated Sep. 8, 2020, pp.
Sak et al., "Long Short-Term Memory based Recurrent Neural Network Architectures for Large Vocabulary Speech Recognition," arXiv:1402.1128v1, Feb. 5, 2014, pp. 1-5.
Van Den Oord et al., "Conditional Image Generation with PixelCNN Decoders," arXiv: 1606.05328v2, 2016, pp. 1-13.
Zuo et al., "Convolutional Recurrent Neural Networks: Learning Spatial Dependencies for Image Representation," Proceedings of the 2015 IEEE Conference on Computer Vision and Pattern Recognition Workshops (CV PRW), 2015, pp. 18-26.

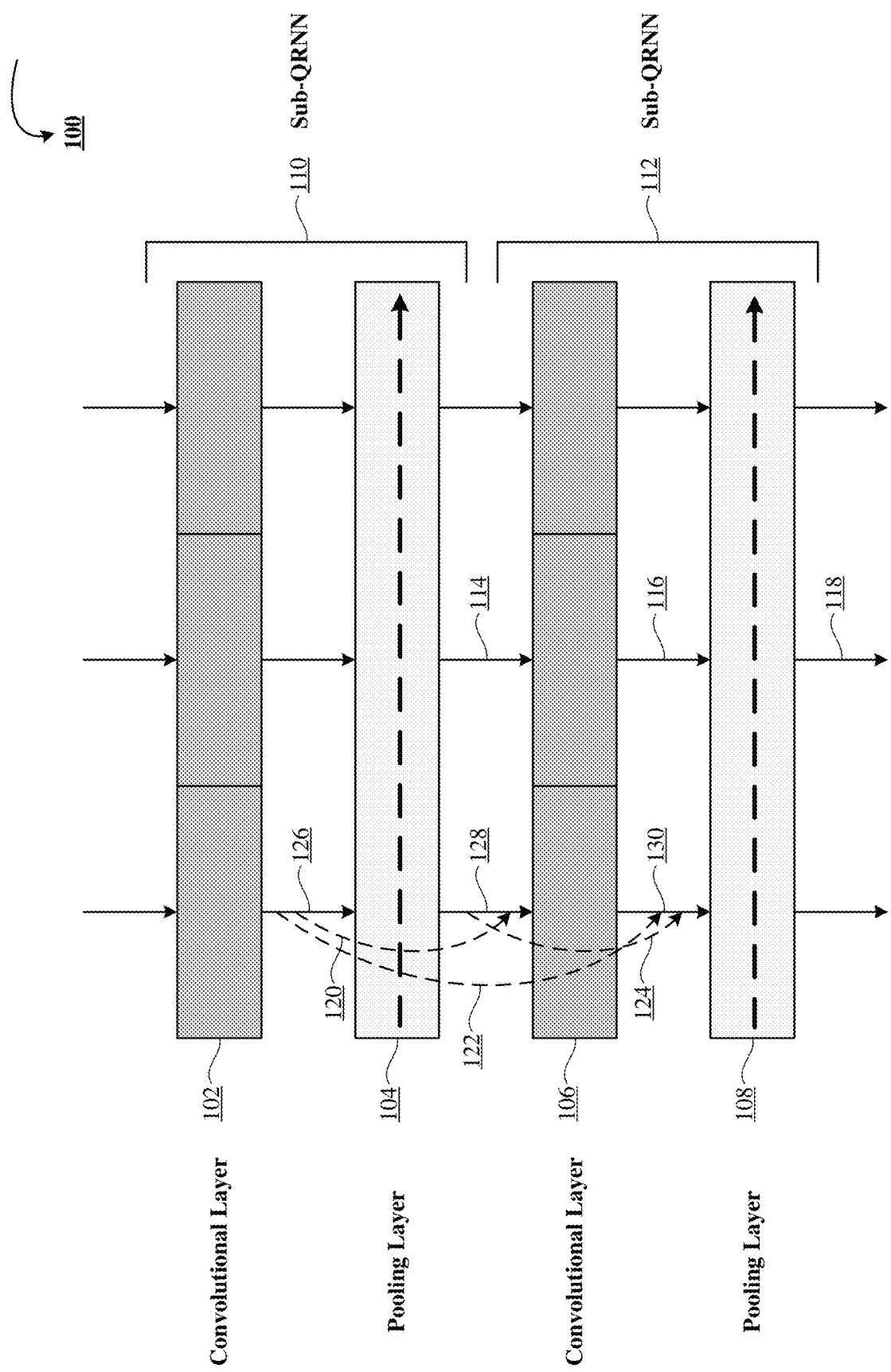
FIG. 1 – Quasi Recurrent Neural Network (QRNN)

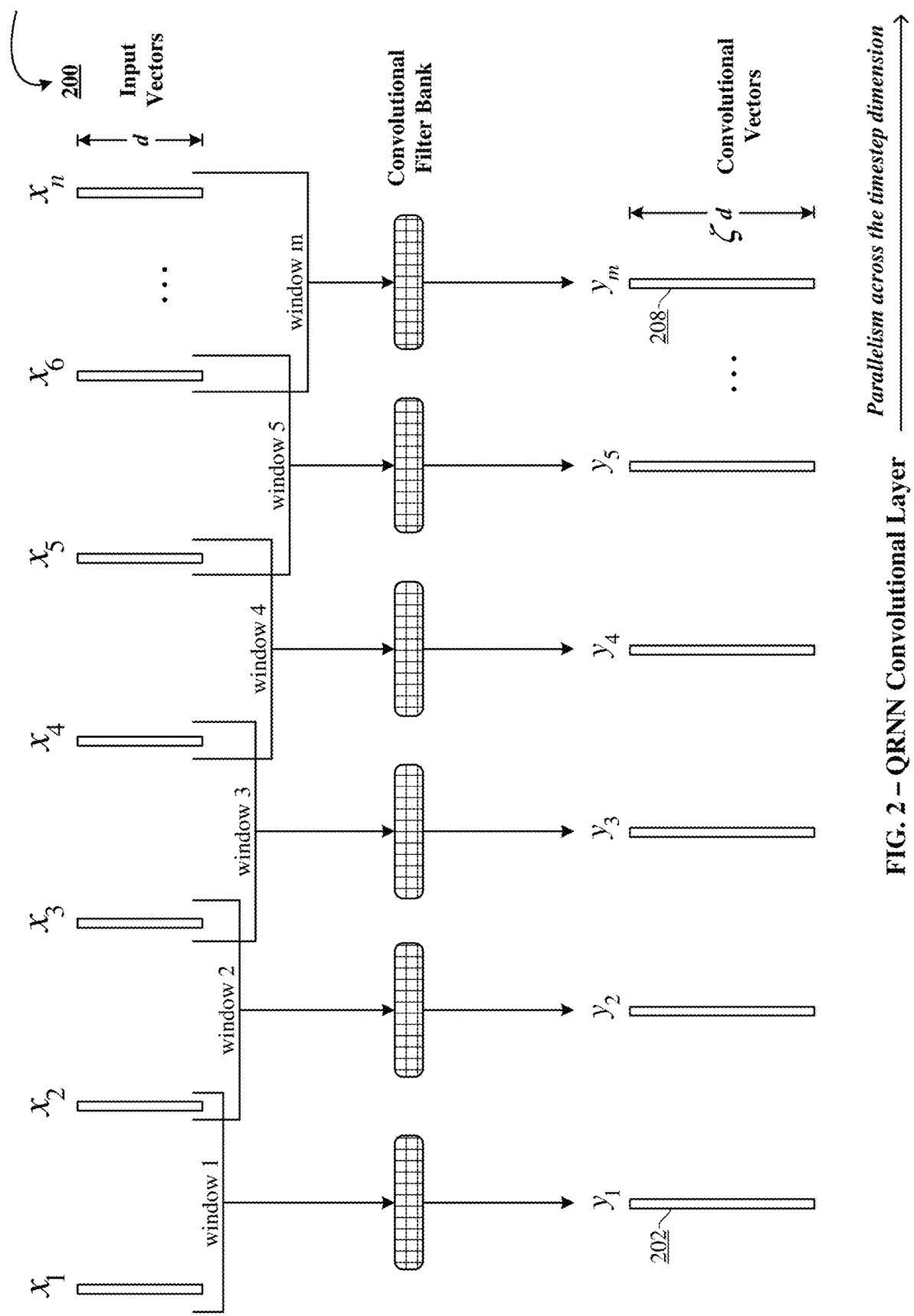
FIG. 2 – QRNN Convolutional Layer

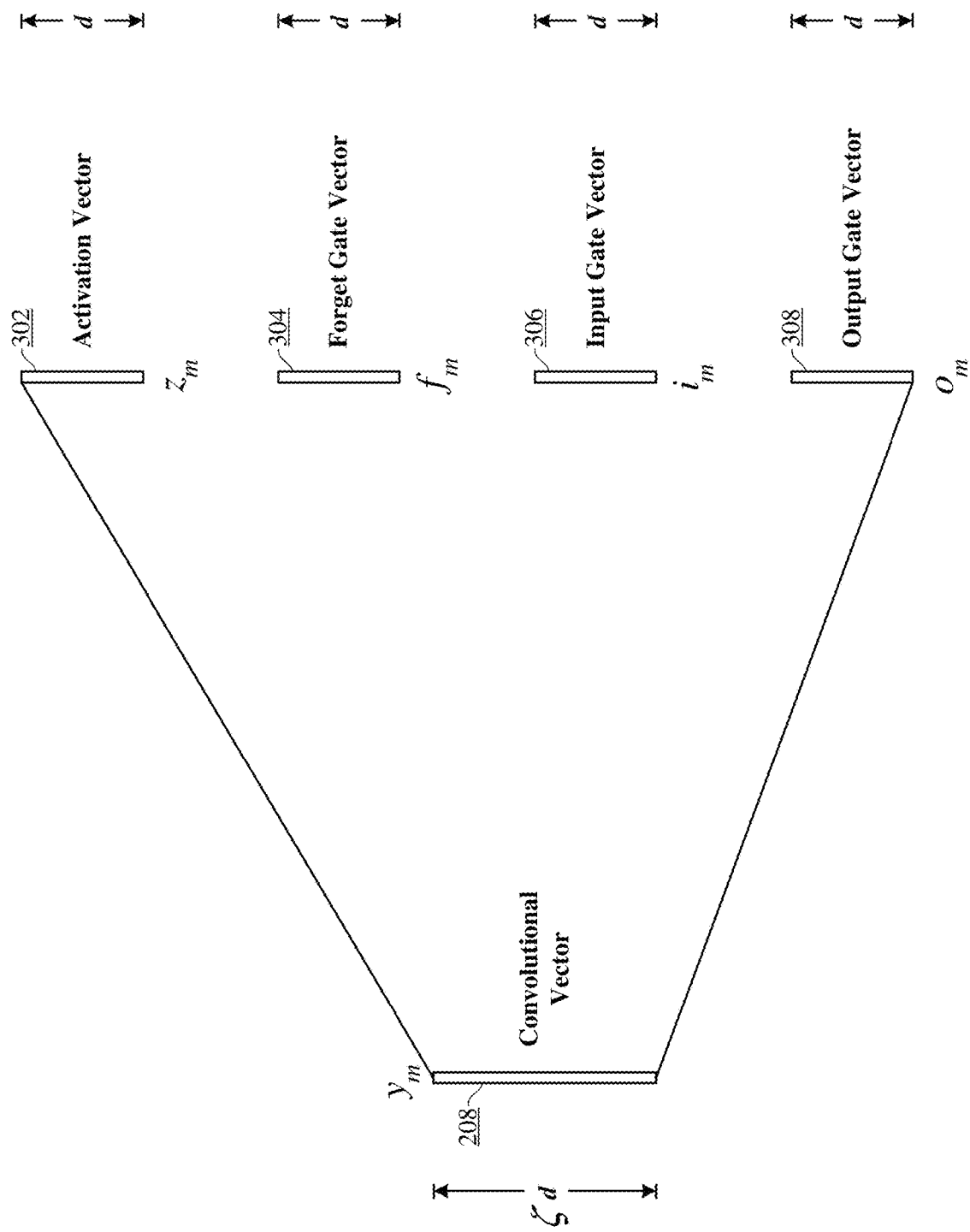
FIG. 3 – Convolutional Vector $$y_1 = \begin{bmatrix} z_1 \\ f_1 \\ i_1 \\ o_1 \end{bmatrix} \quad y_2 = \begin{bmatrix} z_2 \\ f_2 \\ i_2 \\ o_2 \end{bmatrix} \quad y_3 = \begin{bmatrix} z_3 \\ f_3 \\ i_3 \\ o_3 \end{bmatrix} \quad y_4 = \begin{bmatrix} z_4 \\ f_4 \\ i_4 \\ o_4 \end{bmatrix} \quad y_5 = \begin{bmatrix} z_5 \\ f_5 \\ i_5 \\ o_5 \end{bmatrix} \quad \cdots \quad y_m = \begin{bmatrix} z_m \\ f_m \\ i_m \\ o_m \end{bmatrix}$$

Convolutional vector for first time series window (202; 402, 404, 406, 408)

Convolutional vector for $m^{th}$ time series window (208; 302, 304, 306, 308)

FIG. 4 – Convolutional Vectors

$$Z = \begin{Bmatrix} z_1 & z_2 & z_3 & z_4 & z_5 & \cdots & z_m \\ z_1^1 & z_2^1 & z_3^1 & z_4^1 & z_5^1 & \cdots & z_m^1 \\ z_1^2 & z_2^2 & z_3^2 & z_4^2 & z_5^2 & \cdots & z_m^2 \\ z_1^3 & z_2^3 & z_3^3 & z_4^3 & z_5^3 & \cdots & z_m^3 \\ \vdots & \vdots & \vdots & \vdots & \vdots & & \vdots \\ z_1^{100} & z_2^{100} & z_3^{100} & z_4^{100} & z_5^{100} & \cdots & z_m^{100} \end{Bmatrix} \; d=100$$

302

$$F = \begin{Bmatrix} f_1 & f_2 & f_3 & f_4 & f_5 & \cdots & f_m \\ f_1^1 & f_2^1 & f_3^1 & f_4^1 & f_5^1 & \cdots & f_m^1 \\ f_1^2 & f_2^2 & f_3^2 & f_4^2 & f_5^2 & \cdots & f_m^2 \\ f_1^3 & f_2^3 & f_3^3 & f_4^3 & f_5^3 & \cdots & f_m^3 \\ \vdots & \vdots & \vdots & \vdots & \vdots & & \vdots \\ f_1^{100} & f_2^{100} & f_3^{100} & f_4^{100} & f_5^{100} & \cdots & f_m^{100} \end{Bmatrix} \; d=100$$

304

$$I = \begin{Bmatrix} i_1 & i_2 & i_3 & i_4 & i_5 & \cdots & i_m \\ i_1^1 & i_2^1 & i_3^1 & i_4^1 & i_5^1 & \cdots & i_m^1 \\ i_1^2 & i_2^2 & i_3^2 & i_4^2 & i_5^2 & \cdots & i_m^2 \\ i_1^3 & i_2^3 & i_3^3 & i_4^3 & i_5^3 & \cdots & i_m^3 \\ \vdots & \vdots & \vdots & \vdots & \vdots & & \vdots \\ i_1^{100} & i_2^{100} & i_3^{100} & i_4^{100} & i_5^{100} & \cdots & i_m^{100} \end{Bmatrix} \; d=100$$

306

$$O = \begin{Bmatrix} o_1 & o_2 & o_3 & o_4 & o_5 & \cdots & o_m \\ o_1^1 & o_2^1 & o_3^1 & o_4^1 & o_5^1 & \cdots & o_m^1 \\ o_1^2 & o_2^2 & o_3^2 & o_4^2 & o_5^2 & \cdots & o_m^2 \\ o_1^3 & o_2^3 & o_3^3 & o_4^3 & o_5^3 & \cdots & o_m^3 \\ \vdots & \vdots & \vdots & \vdots & \vdots & & \vdots \\ o_1^{100} & o_2^{100} & o_3^{100} & o_4^{100} & o_5^{100} & \cdots & o_m^{100} \end{Bmatrix} \; d=100$$

308

FIG. 5 – Activation Vectors and Gate Vectors

$$c_t^j = f_t^j \cdot c_{t-1}^j + (1-f_t^j) \cdot z_t^j$$

$$\tilde{c}_t^m = \sum_{t=1}^{l} f_t^j \cdot c_{t-1}^j + (1-f_t^j) \cdot z_t^j$$

| $c_0^1=0$ | $c_0^2=0$ | ... | $c_0^{100}=0$ |
|---|---|---|---|
| $c_1^1=f_1^1 \cdot c_0^1 + (1-f_1^1) \cdot z_1^1$ | $c_1^2=f_1^2 \cdot c_0^2 + (1-f_1^2) \cdot z_1^2$ | ⋮ | $c_1^{100}=f_1^{100} \cdot c_0^{100} + (1-f_1^{100}) \cdot z_1^{100}$ |
| $c_2^1=f_2^1 \cdot c_1^1 + (1-f_2^1) \cdot z_2^1$ | $c_2^2=f_2^2 \cdot c_1^2 + (1-f_2^2) \cdot z_2^2$ | ⋮ | $c_2^{100}=f_2^{100} \cdot c_1^{100} + (1-f_2^{100}) \cdot z_2^{100}$ |
| $c_3^1=f_3^1 \cdot c_2^1 + (1-f_3^1) \cdot z_3^1$ | $c_3^2=f_3^2 \cdot c_2^2 + (1-f_3^2) \cdot z_3^2$ | ⋮ | $c_3^{100}=f_3^{100} \cdot c_2^{100} + (1-f_3^{100}) \cdot z_3^{100}$ |
| $c_4^1=f_4^1 \cdot c_3^1 + (1-f_4^1) \cdot z_4^1$ | $c_4^2=f_4^2 \cdot c_3^2 + (1-f_4^2) \cdot z_4^2$ | ⋮ | $c_4^{100}=f_4^{100} \cdot c_3^{100} + (1-f_4^{100}) \cdot z_4^{100}$ |
| $c_5^1=f_5^1 \cdot c_4^1 + (1-f_5^1) \cdot z_5^1$ | $c_5^2=f_5^2 \cdot c_4^2 + (1-f_5^2) \cdot z_5^2$ | ⋮ | $c_5^{100}=f_5^{100} \cdot c_4^{100} + (1-f_5^{100}) \cdot z_5^{100}$ |
| ... | ... | ⋮ | ... |
| $c_m^1=f_m^1 \cdot c_{m-1}^1 + (1-f_m^1) \cdot z_m^1$ | $c_m^2=f_m^2 \cdot c_{m-1}^2 + (1-f_m^2) \cdot z_m^2$ | ⋮ | $c_m^{100}=f_m^{100} \cdot c_{m-1}^{100} + (1-f_m^{100}) \cdot z_m^{100}$ |

← Parallel Operations →

Sequential Operations →

FIG. 6 – QRNN Pooling Layer (Single Gate)

$$c_t^j = f_t^j \cdot c_{t-1}^j + i_t^j \cdot z_t^j$$
$$c_t^j = \prod_{r=1}^{t} f_r^j \cdot \sum_{p=1}^{t} \prod_{q=p+1}^{t} f_q^j \cdot i_p^j \cdot z_p^j$$

| | | | |
|---|---|---|---|
| $c_0^1 = 0$ | $c_0^2 = 0$ | ⋮ | $c_0^{100} = 0$ |
| $c_1^1 = f_1^1 \cdot c_0^1 + i_1^1 \cdot z_1^1$ | $c_1^2 = f_1^2 \cdot c_0^2 + i_1^2 \cdot z_1^2$ | ⋮ | $c_1^{100} = f_1^{100} \cdot c_0^{100} + i_1^{100} \cdot z_1^{100}$ |
| $c_2^1 = f_2^1 \cdot c_1^1 + i_2^1 \cdot z_2^1$ | $c_2^2 = f_2^2 \cdot c_1^2 + i_2^2 \cdot z_2^2$ | ⋮ | $c_2^{100} = f_2^{100} \cdot c_1^{100} + i_2^{100} \cdot z_2^{100}$ |
| $c_3^1 = f_3^1 \cdot c_2^1 + i_3^1 \cdot z_3^1$ | $c_3^2 = f_3^2 \cdot c_2^2 + i_3^2 \cdot z_3^2$ | ⋮ | $c_3^{100} = f_3^{100} \cdot c_2^{100} + i_3^{100} \cdot z_3^{100}$ |
| $c_4^1 = f_4^1 \cdot c_3^1 + i_4^1 \cdot z_4^1$ | $c_4^2 = f_4^2 \cdot c_3^2 + i_4^2 \cdot z_4^2$ | ⋮ | $c_4^{100} = f_4^{100} \cdot c_3^{100} + i_4^{100} \cdot z_4^{100}$ |
| $c_5^1 = f_5^1 \cdot c_4^1 + i_5^1 \cdot z_5^1$ | $c_5^2 = f_5^2 \cdot c_4^2 + i_5^2 \cdot z_5^2$ | ⋮ | $c_5^{100} = f_5^{100} \cdot c_4^{100} + i_5^{100} \cdot z_5^{100}$ |
| ⋯ | ⋯ | | ⋯ |
| $c_m^1 = f_m^1 \cdot c_{m-1}^1 + i_m^1 \cdot z_m^1$ | $c_m^2 = f_m^2 \cdot c_{m-1}^2 + i_m^2 \cdot z_m^2$ | ⋮ | $c_m^{100} = f_m^{100} \cdot c_{m-1}^{100} + i_m^{100} \cdot z_m^{100}$ |

→ *Parallel Operations*

*Sequential Operations* →

FIG. 7 – QRNN Pooling Layer (Multiple Gates)

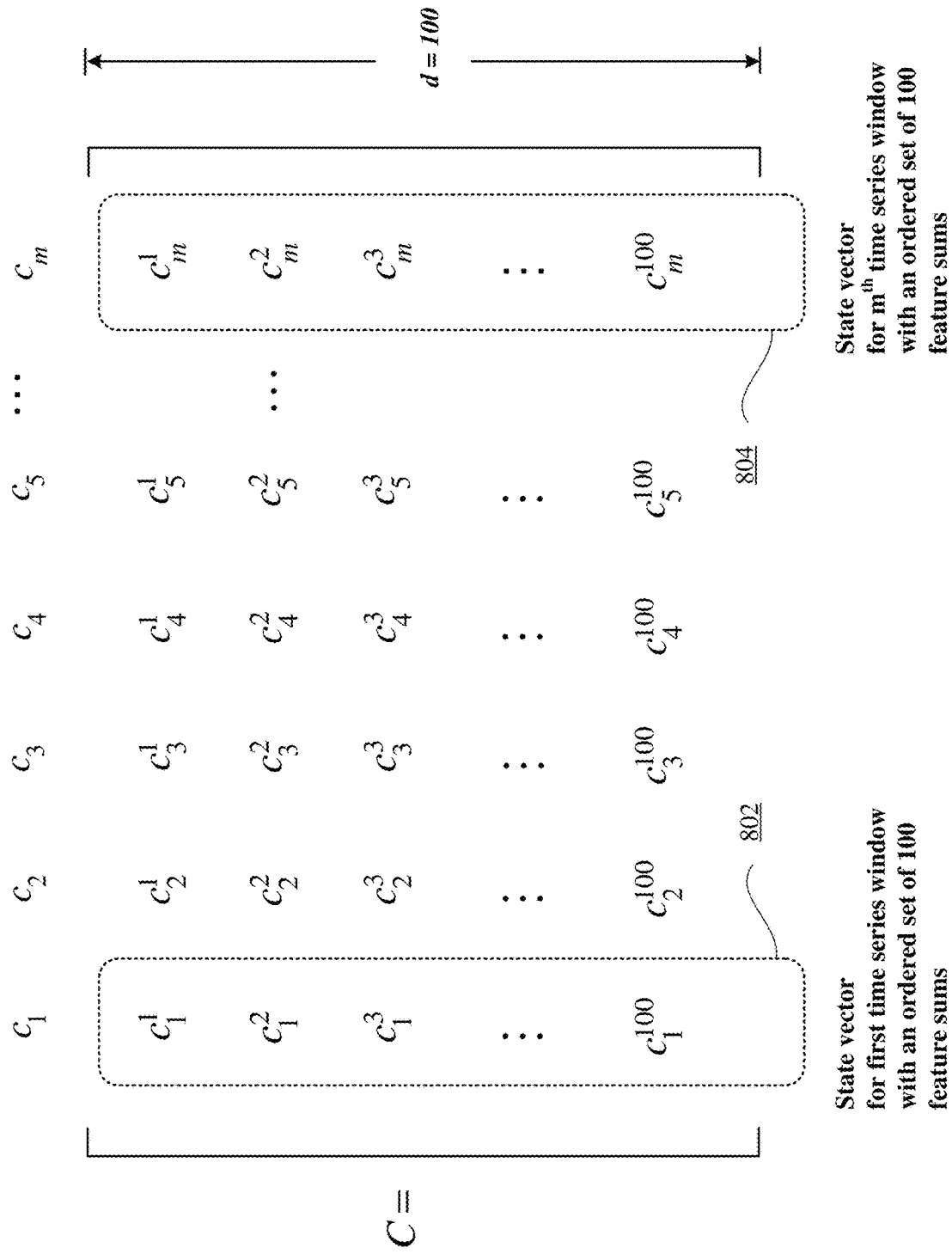
FIG. 8 – State Vector Sequence

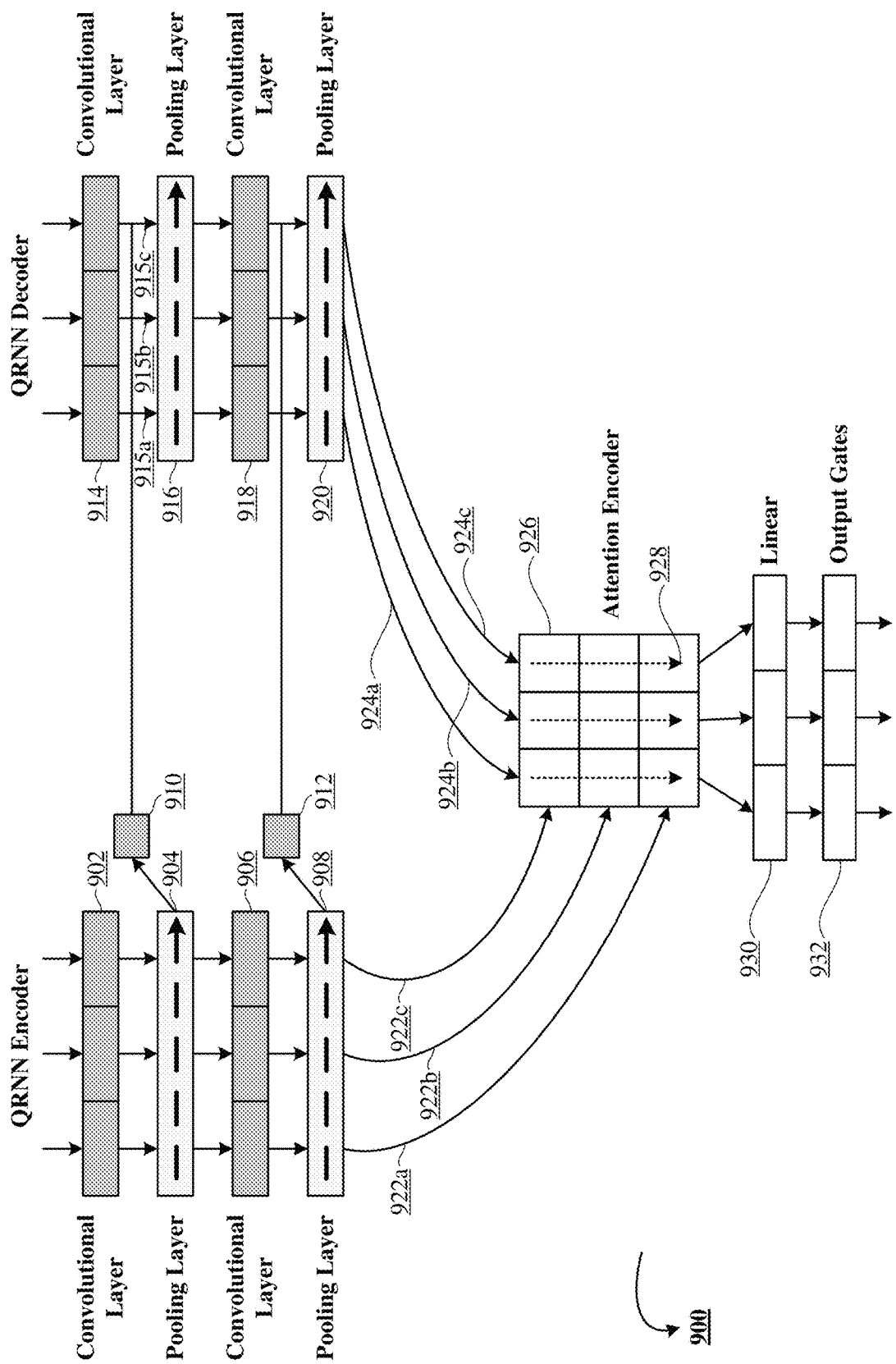
FIG. 9 – QRNN Encoder-Decoder Model

| Model | Time / Epoch (s) | Test Acc (%) |
|---|---|---|
| NBSVM-bi (Wang & Manning, 2012) | — | 91.2 |
| 2 layer sequential BoW CNN (Johnson & Zhang, 2014) | — | 92.3 |
| Ensemble of RNNs and NB-SVM (Mesnil et al., 2014) | — | 92.6 |
| 2-layer LSTM (Longpre et al., 2016) | — | 87.6 |
| Residual 2-layer bi-LSTM (Longpre et al., 2016) | — | 90.1 |
| *Our models* | | |
| Densely-connected 4-layer LSTM (cuDNN optimized) | 480 | 90.9 |
| Densely-connected 4-layer QRNN | 150 | 91.4 |
| Densely-connected 4-layer QRNN with $k=4$ | 160 | 91.1 |

FIG. 10 – Performance on Sentiment Classification Task

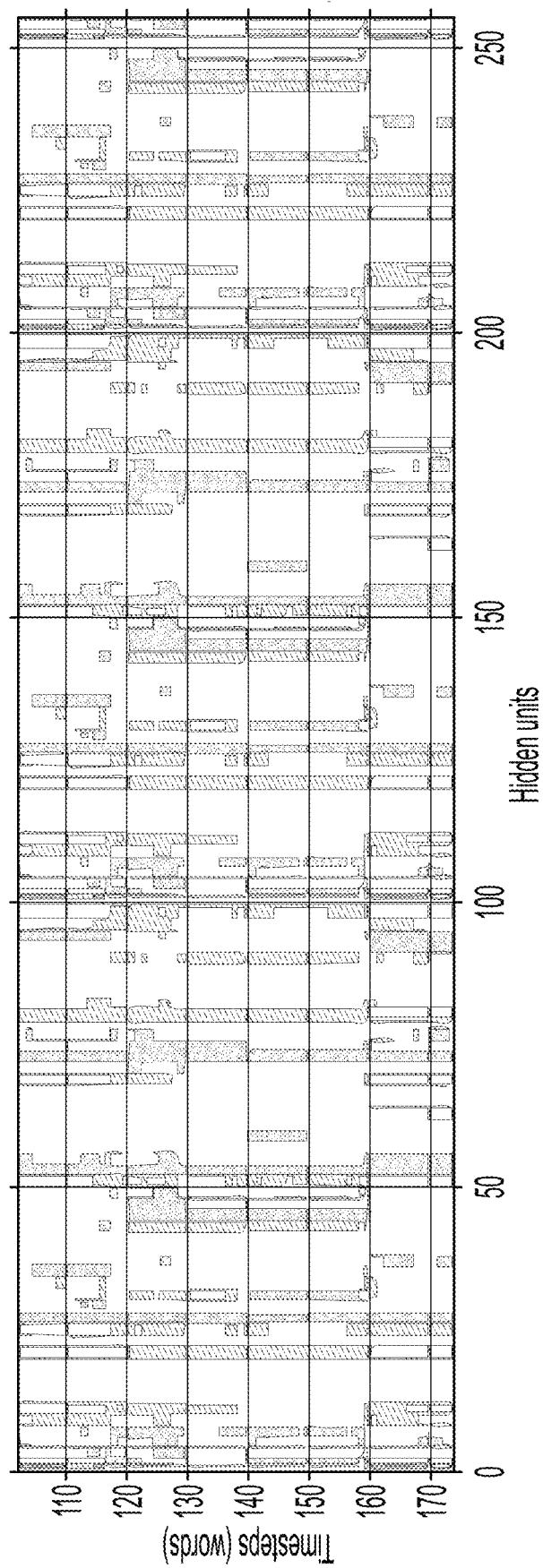
FIG. 11 – Visualization of QRNN's State Vectors

| Model | Parameters | Validation | Test |
|---|---|---|---|
| LSTM (medium) (Zaremba et al., 2014) | 20M | 86.2 | 82.7 |
| Variational LSTM (medium, MC) (Gal & Ghahramani, 2016) | 20M | 81.9 | 79.7 |
| LSTM with CharCNN embeddings (Kim et al., 2016) | 19M | – | 78.9 |
| Zoneout + Variational LSTM (medium) (Merity et al., 2016) | 20M | 84.4 | 80.6 |
| *Our models* | | | |
| LSTM (medium) | 20M | 85.7 | 82.0 |
| QRNN (medium) | 18M | 82.9 | 79.9 |
| QRNN + zoneout ($p = 0.1$) (medium) | 18M | 82.1 | 78.3 |

FIG. 12 – Performance on Language Modeling Task

| Model | Train Time | BLEU (TED.tst2014) |
|---|---|---|
| Word-level LSTM w/attn (Ranzato et al., 2016) | – | 20.2 |
| Word-level CNN w/attn, input feeding (Wiseman & Rush, 2016) | – | 24.0 |
| *Our models* | | |
| Char-level 4-layer LSTM | 4.2 hrs/epoch | 16.53 |
| Char-level 4-layer QRNN with $k = 6$ | 1.0 hrs/epoch | 19.41 |

FIG. 13 – Performance on Language Translation Task

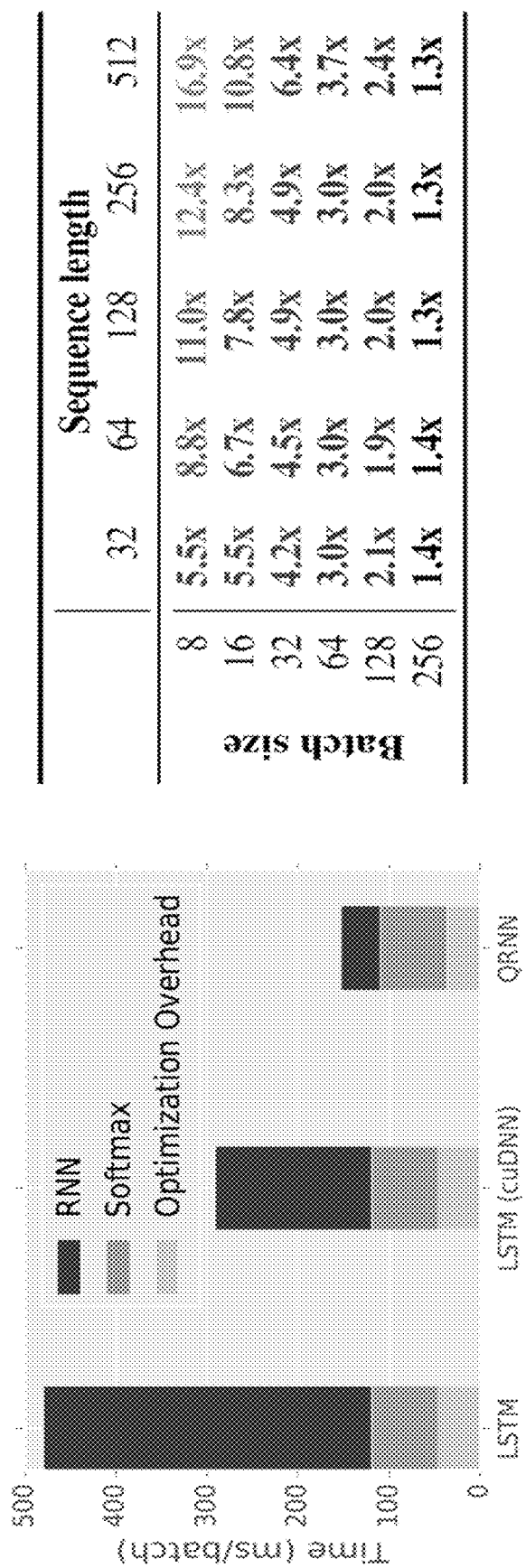
FIG. 14 – Training Speed and Inference Speed

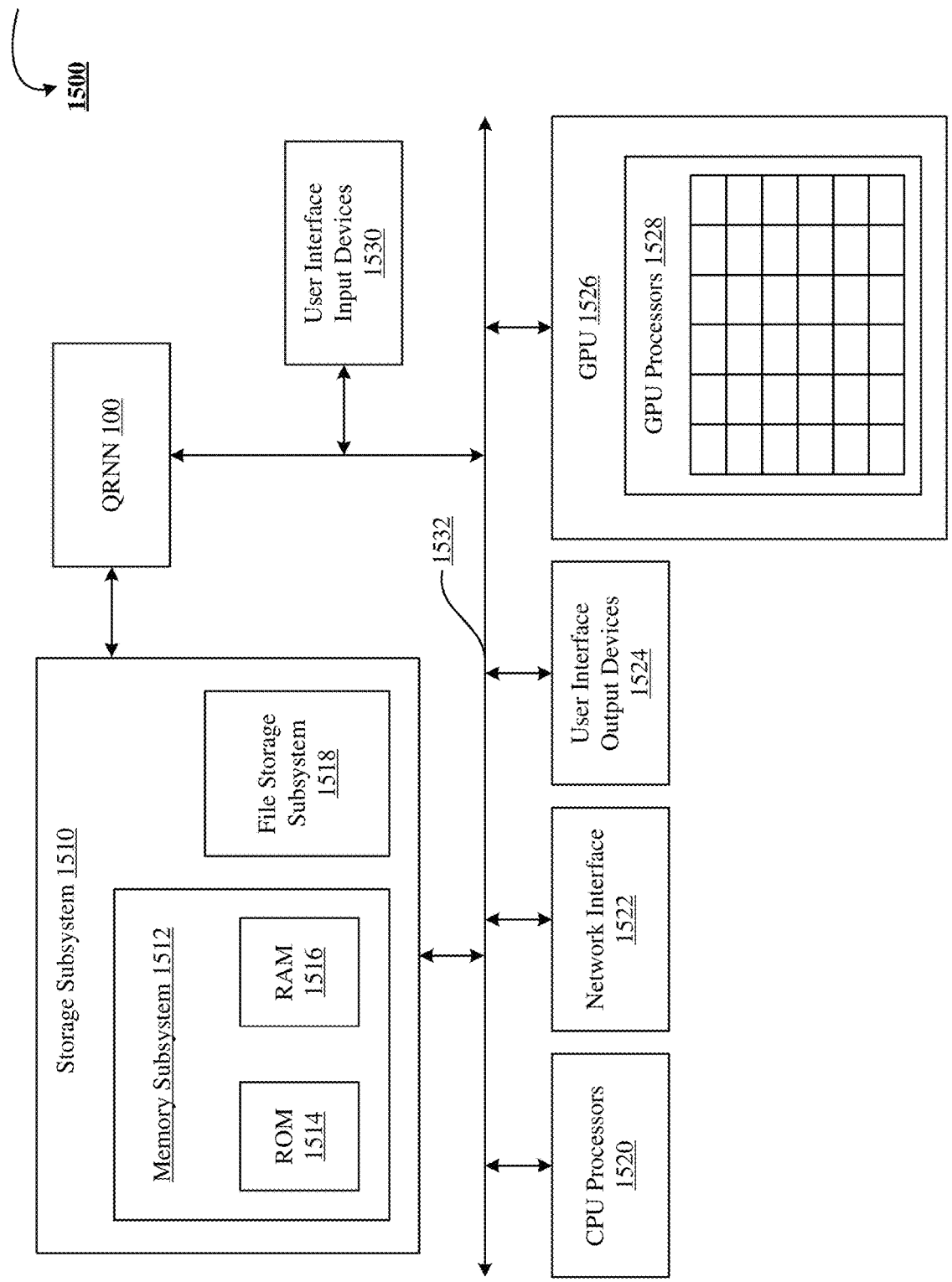
FIG. 15 – Computer System

QUASI-RECURRENT NEURAL NETWORK BASED ENCODER-DECODER MODEL

CROSS REFERENCE TO OTHER APPLICATIONS

The present application is a Continuation of U.S. patent application Ser. No. 15/420,801 (now issued as U.S. Pat. No. 11,080,595), filed Jan. 31, 2017, which claims priority to U.S. Provisional Patent Application 62/417,333, filed on Nov. 4, 2016, and claims priority to U.S. Provisional Patent Application 62/418,075, filed Nov. 4, 2016, which is herein incorporated by reference in its entirety.

FIELD OF THE TECHNOLOGY DISCLOSED

The technology disclosed relates generally to natural language processing (NLP) using deep neural networks, and in particular relates to a quasi-recurrent neural network (QRNN) that increases computational efficiency in NLP tasks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Recurrent neural networks (RNNs) are a powerful tool for modeling sequential data, but the dependence of each timestep's computation on the previous timestep's output limits parallelism and makes RNNs unwieldy for very long sequences. The technology disclosed provides a quasi-recurrent neural network (QRNN) that alternates convolutional layers, which apply in parallel across timesteps, and minimalist recurrent pooling layers that apply in parallel across feature dimensions.

Despite lacking trainable recurrent layers, stacked QRNNs have better predictive accuracy than stacked LSTMs of the same hidden size. Due to their increased parallelism, they are up to 16 times faster at train and test time. Experiments on language modeling, sentiment classification, and character-level neural machine translation demonstrate these advantages and underline the viability of QRNNs as a basic building block for a variety of sequence tasks.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 illustrates aspects of a quasi-recurrent neural network (QRNN) that increases computational efficiency in natural language processing (NLP) tasks.

FIG. 2 shows one implementation of a convolutional layer that operates in parallel over a time series of input vectors and concurrently outputs convolutional vectors.

FIG. 3 depicts one implementation of a convolutional vector comprising an activation vector, a forget gate vector, an input gate vector, and an output gate vector.

FIG. 4 is one implementation of multiple convolutional vectors, and comprising activation vectors and gate vectors, concurrently outputted by a convolutional layer.

FIG. 5 illustrates one implementation of feature values at ordinal positions in activation vectors and gate vectors concurrently outputted by a convolutional layer.

FIG. 6 is one implementation of a single-gate pooling layer that applies accumulators in parallel to concurrently accumulate an ordered set of feature sums in a state vector, and sequentially outputs successive state vectors.

FIG. 7 illustrates one implementation a multi-gate pooling layer that applies accumulators in parallel to concurrently accumulate an ordered set of feature sums in a state vector, and sequentially outputs successive state vectors.

FIG. 8 depicts one implementation of successive state vectors sequentially outputted by a pooling layer.

FIG. 9 is one implementation of a QRNN encoder-decoder model.

FIG. 10 is a table that shows accuracy comparison of the QRNN on sentiment classification task.

FIG. 11 shows one implementation of visualization of QRNN's state vectors.

FIG. 12 depicts a table that shows accuracy comparison of the QRNN on language modeling task.

FIG. 13 is a table that shows accuracy comparison of the QRNN on language translation task.

FIG. 14 depicts charts that show training speed and inference speed of the QRNN.

FIG. 15 is a simplified block diagram of a computer system that can be used to implement the QRNN.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The discussion is organized as follows. First, an introduction describing some of the problems addressed by the QRNN is presented. Then, the convolutional layer that implements timestep-wise parallelism is described, followed by the pooling layer that implements feature dimension-wise parallelism. Next, the QRNN encoder-decoder model is discussed. Lastly, some experimental results illustrating performance of the QRNN on various NLP tasks are provided.

Introduction

Recurrent neural networks (RNNs), including gated variants such as the long short-term memory (LSTM) have become the standard model architecture for deep learning approaches to sequence modeling tasks. RNNs repeatedly apply a function with trainable parameters to a hidden state.

Recurrent layers can also be stacked, increasing network depth, representational power and often accuracy. RNN applications in the natural language domain range from sentence classification to word-level and character-level language modeling. RNNs are also commonly the basic building block for more complex models for tasks such as machine translation or question answering.

In RNNs, computation at each timestep depends on the results from the previous timestep. Due to this reason, RNNs, including LSTMs, are limited in their capability to handle tasks involving very long sequences, such as document classification or character-level machine translation, as the computation of features or states for different parts of the document cannot occur in parallel.

Convolutional neural networks (CNNs), though more popular on tasks involving image data, have also been applied to sequence encoding tasks. Such models apply time-invariant filter functions in parallel to windows along the input sequence. CNNs possess several advantages over recurrent models, including increased parallelism and better scaling to long sequences such as those often seen with character-level language data. Convolutional models for sequence processing have been more successful when combined with RNN layers in a hybrid architecture because traditional max-pooling and average-pooling approaches to combining convolutional features across timesteps assume time invariance and hence cannot make full use of large-scale sequence order information.

The technology disclosed provides a quasi-recurrent neural network (QRNN) that addresses drawbacks of standard models like RNNs and CNNs. QRNNs allow for parallel computation across both timesteps and feature dimensions, enabling high throughput and good scaling to long sequences. Like RNNs, QRNNs allow the output to depend on the overall order of elements in the sequence. QRNNs are tailored to several natural language tasks, including document-level sentiment classification, language modeling, and character-level machine translation. QRNNs outperform strong LSTM baselines on all three tasks while dramatically reducing computation time.

Intuitively, many aspects of the semantics of long sequences are context-invariant and can be computed in parallel (e.g., convolutionally), but some aspects require long-distance context and must be computed recurrently. Many existing neural network architectures either fail to take advantage of the contextual information or fail to take advantage of the parallelism. QRNNs exploit both parallelism and context, exhibiting advantages from both convolutional and recurrent neural networks. QRNNs have better predictive accuracy than LSTM-based models of equal hidden size, even though they use fewer parameters and run substantially faster.

Experiments show that the speed and accuracy advantages remain consistent across tasks and at both word and character levels. Extensions to both CNNs and RNNs are directly applicable to the QRNN, while the model's hidden states are more interpretable than those of other recurrent architectures as its channels maintain their independence across timesteps. Therefore, an opportunity arises for the QRNNs to serve as a building block for long-sequence tasks that were previously impractical with traditional RNNs.

Quasi-Recurrent Neural Network (QRNN)

FIG. 1 shows the computation structure of a QRNN 100. QRNN 100 contains two kinds of components or layers, namely, convolutional layers (like 102, 106) and pooling layers (like 104, 108). The convolutional layers 102, 106 allow fully parallel computation across sequence minibatches and timesteps. The pooling layers 104, 108 lack trainable parameters and apply fully parallel computation across sequence minibatches and feature dimensions. In FIG. 1, the continuous blocks of the pooling layers 104, 108 indicate parameterless functions that operate in parallel along the feature dimensions.

FIG. 1 also shows sub-QRNNs 110, 112. Sub-QRNN 110 contains at least one convolutional layer 102 and at least one pooling layer 104. Sub-QRNN 112 contains at least one convolutional layer 106 and at least one pooling layer 108. In other implementations, each of the sub-QRNNs 110, 112 include any number of convolutional layers (e.g., two, three, or more) and any number of pooling layers (e.g., two, three, or more). Also in other implementations, QRNN 100 can include one or more sub-QRNNs.

In some implementations, QRNN 100 contains a sequence of sub-QRNNs arranged from a lowest sub-QRNN in the sequence to a highest sub-QRNN in the sequence. As used herein, a QRNN with multiple sub-QRNNs arranged in a sequence is referred to as a "stacked QRNN". A stacked QRNN, such as QRNN 100, processes received input data through each of the sub-QRNNs in the sequence to generate an alternative representation of the input data. In addition, the sub-QRNNs, such as sub-QRNNs 110, 112, receive, as input, a preceding output generated by a preceding sub-QRNN in the sequence. For example, in FIG. 1, second convolutional layer 106 of the second sub-QRNN 112 processes, as input, output from the preceding first pooling layer 104 of the first sub-QRNN 110. In contrast, first convolutional layer 102 of the first sub-QRNN 110 takes, as input, embedded vectors (e.g., word vectors, character vectors, phrase vectors,) mapped to a high-dimensional embedding space. Thus, in some implementations, varied input is provided to different sub-QRNNs of a stacked QRNN and/or to different components (e.g., convolutional layers, pooling layers) within a sub-QRNN.

Furthermore, QRNN 100 processes the output from a preceding sub-QRNN through a convolutional layer to produce an alternative representation of the preceding output. Then, the QRNN 100 processes the alternative representation through a pooling layer to produce an output. For example, in FIG. 1, the second sub-QRNN 112 uses the second convolutional layer 106 to convolve preceding output 114 from the first pooling layer 104 of the first sub-QRNN 110. The convolution produces an alternative representation 116, which is further processed by the second pooling layer 108 of the second sub-QRNN 112 to produce an output 118.

In some implementations, QRNN 100 also includes skip connections between the sub-QRNNs and/or between layers in a sub-QRNN. The skip connections, such as 120, 122, 124, concatenate output of a preceding layer with output of a current layer and provide the concatenation to a following layer as input. In one example of skip connections between layers of a sub-QRNN, skip connection 120 concatenates output 126 of the first convolutional layer 102 of the first sub-QRNN 110 with output 128 of the first pooling layer 104 of the first sub-QRNN 110. The concatenation is then provided as input to the second convolutional layer 106 of the second sub-QRNN 112. In one example of skip connections between sub-QRNNs, skip connection 122 concatenates the output 126 of the first convolutional layer 102 of the first sub-QRNN 110 with output 130 of the second convolutional layer 106 of the second sub-QRNN 112. The concatenation is then provided as input to the second pooling layer 108 of the second sub-QRNN 112. Likewise, skip connection 124 concatenates the output 128 of the first pooling layer 104 of the first sub-QRNN 110 with output 130 of the second convolutional layer 106 of the second sub-QRNN 112. The concatenation is then provided as input to the second pooling layer 108 of the second sub-QRNN 112.

For sequence classification tasks, QRNN 100 includes skip connections between every QRNN layer, which are referred to herein as "dense connections". In one implementation, QRNN 100 includes dense connections between the input embeddings and every QRNN layer and between every pair of QRNN layers. This results in QRNN 100 concatenating each QRNN layer's input to its output along the feature dimension, before feeding the resulting state vectors into the next layer. The output of the last layer is then used as the overall encoding result.

QRNN Convolutional Layer Timestep Parallelism

FIG. 2 shows one implementation of operation of a QRNN convolutional layer 200. FIG. 2 shows d-dimensional input vectors $X_1, \ldots, X_6, \ldots, X_n$ representing n elements in an input sequence $X \in \mathbb{R}^{d \times n}$. Input vectors $X_1, \ldots, X_6, \ldots, X_n$ are respectively produced over n timesteps. In one implementation, the input sequence is a word-level input sequence with n words. In another implementation, the input sequence is a character-level input sequence with n characters. In yet another implementation, the input sequence is a phrase-level input sequence with n phrases. The input vectors $X_1, \ldots, X_6, \ldots, X_n$ are mapped to a high-dimensional vector space, referred to herein as an "embedding space". The embedding space is defined using an embedding matrix $E \in \mathbb{R}^{d \times |V|}$, where V represents the size of the vocabulary. In implementations, the embedding space can be a word embedding space, a character embedding space, or a phrase embedding space. In some implementations, the input vectors $X_1, \ldots, X_6, \ldots, X_n$ are initialized using pre-trained embedding models like GloVe and word2vec. In yet other implementations, the input vectors are based on one-hot encoding.

QRNN convolutional layer 200 performs parallel convolutions to m time series windows over the input vectors $X_1, \ldots, X_6, \ldots, X_n$ with a bank of b filters to concurrently output a $Y \in \mathbb{R}^{\zeta d \times m}$ of m convolutional vectors $y_1, \ldots, y_5, \ldots, y_m$. $\zeta d$ is the dimensionality of each convolutional vector, where $\zeta$ identifies a dimensionality augmentation parameter. As used herein, "parallelism across the timestep or time series dimension" or "timestep or time series parallelism" refers to the QRNN convolutional layer 200 applying a convolutional filter bank in parallel to the input vectors $X_1, \ldots, X_6, \ldots X_n$ over m time series windows to concurrently produce m convolutional vectors $y_1, \ldots, y_5, \ldots, y_m$.

In implementations, dimensionality of the concurrently outputted convolutional vectors $y_1, \ldots, y_5, \ldots, y_m$ is augmented relative to dimensionality of the input vectors $X_1, \ldots, X_6, \ldots, X_n$ in dependence upon a number of convolutional filters in the convolutional filter bank. Thus the dimensionality augmentation parameter $\zeta$ is proportionally dependent on the number of convolutional filters in the convolutional filter bank such that $\zeta d = b$. For example, if the dimensionality of the input vectors $X_1, \ldots, X_6, \ldots, X_n$ is 100, i.e., d=100, and the convolutional filter bank contains 200 convolutional filters, i.e., b=200, then the dimensionality of the concurrently outputted convolutional vectors $y_1, \ldots, y_5, \ldots, y_m$ is 200, i.e., $\zeta d=200$ and $\zeta=2$. In other implementations, the convolutional filter bank is configured with varied number of convolutional filters, such that the dimensionality $\zeta d$ of the concurrently outputted convolutional vectors is 300, 400, 500, 800, or any other number.

FIG. 3 depicts one implementation of a convolutional vector $y_m$ 208 comprising an activation vector $Z_m$ 302, a forget gate vector $f_m$ 304, an input gate vector $i_m$ 306, and an output gate vector $O_m$ 308. In implementations, a convolutional vector can include any combination of an activation vector and one or more gate vectors. For example, in one implementation, a convolutional vector comprises an activation vector and a forget gate vector. In another implementation, a convolutional vector comprises an activation vector, a forget gate vector, and input gate vector. In yet another implementation, a convolutional vector comprises an activation vector, a forget gate vector, and output gate vector.

In implementations, a number of gate vectors in a convolutional vector is configured in dependence upon the dimensionality $\zeta d$ of the convolutional vector, such that $\zeta d$ dimensions are proportionally split between an activation vector and one or more gate vectors of the convolutional vector. In one example, for convolutional vector $y_m$ 208, if $\zeta d=400$, then the activation vector $Z_m$ 302, the forget gate vector $f_m$ 304, the input gate vector $i_m$ 306, and the output gate vector $O_m$ 308, all have the same dimensionality d=100. In another example, for a convolutional vector of dimensionality $\zeta d=200$, the convolutional vector comprises an activation vector and only one gate vector (e.g., a forget gate vector), each of dimensionality d=100. In yet another example, for a convolutional vector of dimensionality $\zeta d=300$, the convolutional vector comprises an activation vector and two gate vectors (e.g., a forget gate vector and a output gate vector or a forget gate vector and an input gate vector), each of dimensionality d=100.

FIG. 4 is one implementation of multiple convolutional vectors $y_1, \ldots, y_5, \ldots, y_m$, and comprising activation vectors and gate vectors, concurrently outputted by the QRNN convolutional layer 200. FIG. 4 shows a convolutional vector $y_1$ 202 generated by the QRNN convolutional layer 200 for the first time series window. Convolutional vector $y_1$ 202 comprises an activation vector $Z_1$ 402, a forget gate vector $f_1$ 404, an input gate vector $i_1$ 406, and an output gate vector $O_1$ 408. Similarly, the QRNN convolutional layer 200 produces the convolutional vector $y_m$ 208 for the $m^{th}$ time series window.

In some implementations, in order to be useful for tasks that include prediction of the next element of an input sequence, the convolutional filters must not allow the computation for any given timestep to access information from future timesteps. That is, with filters of width k, each convolutional vector $y_t$ depends only on input vectors $X_{t-k+1}$ through $X_t$. Such a convolutional operation is referred to herein as "masked convolution". In one implementation, masked convolution is applied by padding the input to the left by the convolution's filter size minus one.

The concurrently outputted convolutional vectors $y_1, \ldots, y_5, \ldots, y_m$ provide the activation vectors and the gate vectors that are used by a QRNN pooling layer to implement one or more QRNN pooling functions. In one implementation, prior to being used by a QRNN pooling layer, the activation vectors and the gate vectors are subjected to preprocessing. In one implementation, the preprocessing includes passing the activation vectors through a hyperbolic tangent nonlinearity activation (tanh). In one implementation, the preprocessing includes passing the gate vectors through an elementwise sigmoid nonlinearity activation ($\sigma$). For a QRNN pooling function that requires a forget gate vector $f_t$ and an output gate vector $O_t$ at each timestep window, the computations in a corresponding QRNN convolutional layer are defined by the following mathematical formulations:

$$Z = \tanh(W_z * X)$$

$$F = \sigma(W_f * X)$$

$$O = \sigma(W_O * X)$$

where the activation vector $W_z$, $W_f$, and $W_O$, each in $\mathbb{R}^{k \times n \times m}$, are convolutional filter banks and * denotes a masked convolution along the timestep dimension.

In one exemplary implementation, when the filter width of the convolutional filters is 2, the activation vector and the gate vectors represent LSTM-like gates and are defined by the following mathematical formulations:

$$z_t = \tanh(W_z^1 x_{t-1} + W_z^2 x_t)$$

$$f_t = \sigma(W_f^1 x_{t-1} + W_f^2 x_t)$$

$$i_t = \sigma(W_i^1 x_{t-1} + W_i^2 x_t)$$

$$O_t = \sigma(W_O^1 x_{t-1} + W_O^2 x_t)$$

where the activation vector $z_t$, the forget gate vector $f_t$, the input gate vector $i_t$, and the output gate vector $O_t$ are concurrently produced by applying respective convolutional filter weight matrices $W_z^1$, $W_z^2$, $W_f^1$, $W_f^2$, $W_i^1$, $W_i^2$, $W_O^1$, $W_O^2$ to the input vectors $X_{t-1}$ and $X_t$.

In other implementations, convolutional filters of larger width are used to compute higher n-gram features at each timestep window. In implementations, larger widths are especially effective for character-level tasks.

QRNN Pooling Layer—QRNN Pooling Functions

QRNN pooling layers implement various QRNN pooling functions. QRNN pooling functions are controlled by one or more gate vectors provided by a corresponding QRNN convolutional layer. The gate vectors mix state vectors across timestep windows, while independently operating on each element of a state vector. In implementations, QRNN pooling functions are constructed from elementwise gates of an LSTM cell. In other implementations, QRNN pooling functions are constructed based on variants of an LSTM, such as no input gate (NIG) variant, no forget gate (NFG) variant, no output gate (NOG) variant, no input activation function (NIAF) variant, no output activation function (NOAF) variant, coupled input-forget gate (CIFG) variant, and full gate recurrent (FGR) variant. In yet other implementations, QRNN pooling functions are constructed based on operations of a gated recurrent unit (GRU), or any other type of RNN, or any other conventional or future-developed neural network.

f-Pooling

Consider the following mathematical formulation which defines one implementation of a QRNN pooling function, referred to herein as "f-pooling", which uses a single gate vector:

$$c_t = f_t \odot c_{t-1} + (1 - f_t) \odot z_t \quad (1)$$

where,
$C_t$ is the current state vector
$f_t$ is the current forget state vector
$C_{t-1}$ is the previous state vector
$Z_t$ is the current activation state vector
$\odot$ denotes elementwise multiplication or Hadamard Product Regarding the state vector, a current state vector $C_t$ is the consolidation of a current activation vector $z_t$ with the past state vector $C_{t-1}$. The current activation vector $z_t$ is identified by a current convolutional vector $y_t$, which is derived from a convolution over a current time series window of input vectors $X_t, \ldots, X_{t+k-1}$, where k is the convolutional filter size or width. Anthropomorphically, the current state vector $C_t$ knows the recipe of combining or mixing a currently convolved input vector window $X_t, \ldots, X_{t+k-1}$ with the past state vector $C_{t-1}$ so as to summarize the current input vector window $X_t, \ldots, X_{t+k-1}$ in light of the contextual past. Thus the current activation vector $z_t$ and the past state vector $C_{t-1}$ are used to generate the current state vector $C_t$ that includes aspects of the current input vector window $X_t, \ldots, X_{t+k-1}$.

Regarding the forget gate vector, a current forget gate vector $f_t$ makes an assessment of how much of the past state vector $C_{t-1}$ is useful for the computation of the current state vector C. In addition, the current forget gate vector $f_t$ also provides an assessment of how much of the current activation vector $z_t$ is useful for the computation of the current state vector $C_t$.

fo-Pooling

In some implementations, a QRNN pooling function, which uses an output gate vector in addition to the forget gate vector, is referred to herein as "fo-pooling" and defined by the following mathematical formulations:

$$c_t = f_t \odot c_{t-1} + (1 - f_t) \odot z_t \quad (1)$$

$$h_t = o_t \odot c_t \quad (2)$$

where,
$h_t$ is the current hidden state vector
$O_t$ is the current output state vector
$C_t$ is the current state vector
$\odot$ denotes elementwise multiplication or Hadamard Product The current state vector $C_t$ may contain information that is not necessarily required to be saved. A current output gate vector $O_t$ makes an assessment regarding what parts of the current state vector $C_t$ need to be exposed or present in a current hidden state vector $h_t$.

ifo-Pooling

Consider the following mathematical formulation which defines one implementation of a QRNN pooling function, referred to herein as "ifo-pooling", which uses multiple gate vectors:

$$c_t = f_t \odot c_{t-1} + i_t \odot z_t \quad (3)$$

where,
$C_t$ is the current state vector
$f_t$ is the current forget state vector
$C_{t-1}$ is the previous state vector
$i_t$ is the current input state vector
$Z_t$ is the current activation state vector
$\odot$ denotes elementwise multiplication or Hadamard Product Regarding the input gate vector, for generating the current state vector $C_t$, a current input gate vector $i_t$ takes into account the importance of the current activation vector $z_t$, and, by extension, also the importance of the current input vector window $X_t, \ldots, X_{t+k-1}$. The input gate vector $i_t$ is an indicator of how much of the current input is worth preserving and thus is used to gate the current state vector $C_t$.

Therefore, anthropomorphically, mathematical formulation (3) involves: taking advice of the current forget gate vector $f_t$ to determine how much of the past state vector $C_{t-1}$ should be forgotten, taking advice of the current input gate vector $i_t$ to determine how much of the current activation vector $Z_t$ should be taken into account, and summing the two results to produce the current state vector $C_t$.

QRNN Pooling Layer Feature Dimension Parallelism

A QRNN pooling layer calculates a state vector for each of the m time series windows using one or more QRNN pooling functions such as f-pooling, fo-pooling, and ifo-pooling. Each state vector is composed of a plurality of elements. Each element of a state vector is referred to herein as a "feature sum". Each feature sum of a state vector is identified by a corresponding ordinal position in the state vector.

Consider the state vector sequence C depicted in FIG. 8. Sequence C comprises state vectors $C_1, \ldots, C_m$. In one example, a state vector $C_1$ 802 for the first time series window is composed of the following ordered set of 100 feature sums:

$$C_1^1, \ldots, C_1^{100}$$

where the superscript identifies the ordinal position of a given feature sum in a particular state vector and the subscript identifies the particular state vector, and, by extension, also the particular time series window.

Similarly, a state vector $C_m$ 804 for the $m^{th}$ time series window is also composed of an ordered set of 100 feature sums $C_m^1, \ldots, C_m^{100}$.

The number of feature sums or elements in a state vector is proportionally dependent on the dimensionality d of the state vector. Thus, since state vector $C_1$ 802 has a dimensionality of 100, i.e., d=100, it has 100 feature sums. Also, the dimensionality d of a state vector is dependent on the dimensionality of the activation vectors and gate vectors used to calculate the state vector. In implementations, the activation vectors, the gate vectors, and the resulting state vectors share the same dimensionality d.

Typically, all the state vectors produced by a QRNN pooling layer for a given input sequence share the same dimensionality d. Thus, as shown in FIG. 8, state vectors $C_1, \ldots, C_m$ have the same number of feature sums or elements, with each feature sum being identified by a corresponding ordinal position within each state vector.

Like state vectors, the activation vectors and the gate vectors are also composed of a plurality of elements. Each element of an activation vector is referred to herein as a "feature value". Similarly, each element of a gate vector is also referred to herein as a "feature value". Each feature value of an activation vector is identified by a corresponding ordinal position in the activation vector. Similarly, each feature value of a gate vector is identified by a corresponding ordinal position in the gate vector.

Turning to FIG. 5, it shows an activation vector sequence Z of $z_1, \ldots, z_m$ activation vectors, a forget gate vector sequence F of $f_1, \ldots, f_m$ forget gate vectors, an input gate vector sequence I of $i_1, \ldots, i_m$ input gate vectors, and an output gate vector sequence O of $o_1, \ldots, o_m$ output gate vectors. As discussed above, the QRNN convolutional layer 200 concurrently outputs all the activation vectors and the gate vectors in the sequences Z, F, I, and O.

In one example, an activation vector $Z_1$ 402 for the first time series window is composed of the following ordered set of 100 feature values:

$$z_1^1, \ldots, z_1^{100}$$

where the superscript identifies the ordinal position of a given feature value in a particular activation vector and the subscript identifies the particular activation vector, and, by extension, also the particular time series window.

Similarly, an activation vector $Z_m$ 302 for the $m^{th}$ time series window is also composed of an ordered set of 100 feature values $Z_m^1, \ldots, Z_m^{100}$.

In another example, a forget gate vector $f_1$ 404 for the first time series window is composed of the following ordered set of 100 feature values:

$$f_1^1, \ldots, f_1^{100}$$

where the superscript identifies the ordinal position of a given feature value in a particular forget gate vector and the subscript identifies the particular forget gate vector, and, by extension, also the particular time series window.

Similarly, a forget gate vector $f_m$ 304 for the $m^{th}$ time series window is also composed of an ordered set of 100 feature values $f_m^1, \ldots, f_m^{100}$.

In yet another example, an input gate vector $i_1$ 406 for the first time series window is composed of the following ordered set of 100 feature values:

$$i_1^1, \ldots, i_1^{100}$$

where the superscript identifies the ordinal position of a given feature value in a particular input gate vector and the subscript identifies the particular input gate vector, and, by extension, also the particular time series window.

Similarly, an input gate vector $i_m$ 306 for the $m^{th}$ time series window is also composed of an ordered set of 100 feature values $i_m^1, \ldots, i_m^{100}$.

In yet further example, an output gate vector $O_1$ 408 for the first time series window is composed of the following ordered set of 100 feature values:

$$o_1^1, \ldots, o_1^{100}$$

where the superscript identifies the ordinal position of a given feature value in a particular output gate vector and the subscript identifies the particular output gate vector, and, by extension, also the particular time series window.

Similarly, an output gate vector $O_m$ 308 for the $m^{th}$ time series window is also composed of an ordered set of 100 feature values $O_m^1, \ldots, O_m^{100}$.

As used herein, "parallelism across the feature dimension" or "feature parallelism" refers to a QRNN pooling layer operating in parallel over feature values of a convolutional vector, i.e., over corresponding feature values in a respective activation vector and one or more gate vectors produced by the convolutional vector, to concurrently accumulate, in a state vector, an ordered set of feature sums. The accumulation of the feature sums can be based on one or more QRNN pooling functions such as f-pooling, fo-pooling, and ifo-pooling, and typically involves the feature values in the gate vectors serving as parameters that, respectively, apply element-wise by ordinal position to the feature values in the activation vector.

Consider one example of feature parallelism in FIG. 6, which is based on f-pooling implemented by a single-gate QRNN pooling layer 600. Note that the QRNN pooling layer 600 applies f-pooling "ordinal position-wise" using the following mathematical formulation:

$$\bigvee_{t=1}^{t=m} \bigvee_{j=1}^{j=d} c_t^j = f_t^j \cdot c_{t-1}^j + (1 - f_t^j) \cdot z_t^j \quad (4)$$

where, the pair for all symbols indicate operations over two dimensions of a matrix and $$\bigvee_{t=1}^{t=m}$$

denotes operation over successive time series windows $$\bigvee_{j=1}^{j=d}$$

denotes operations over ordinal positions, which are parallelizable

- $C_t^j$ is the feature sum at the J ordinal position in the current state vector $C_t$
- $f_t^j$ is the feature value at the j ordinal position in the current forget gate vector $f_t$
- $C_{t-1}^j$ is the feature value at the J ordinal position in the previous state vector $C_{t-1}$
- $z_t^j$ is the feature value at the j ordinal position in the current activation vector $z_t$
- · denotes multiplication Mathematical formulation (4) involves computing a feature sum $C_t^j$ for a given ordinal position j in a state vector $C_t$ for a current time series window t in dependence upon: a feature sum $C_{t-1}^j$ at the same ordinal position j in a state vector $C_{t-1}$ for a previous time series window t−1, a feature value $f_t^j$ at the same ordinal position j in a forget gate vector $f_t$ for a current time series window t, and a feature value $z_t^j$ at the same ordinal position j in a forget gate vector $Z_t$ for a current time series window t.

Therefore, anthropomorphically, in mathematical formulation (4), each feature value of a current forget gate vector controls ordinal position-wise accumulation of a respective feature value from a current activation vector and a respective feature sum from a previous state vector. Thus, in FIG. 6, feature sum $C_1^1$ is accumulated in dependence upon feature sum $C_O^1$, feature value $f_1^1$, and feature value $Z_1^1$. Similarly, feature sum $C_1^2$ is accumulated in dependence upon feature sum $C_0^2$, feature value $f_1^2$, and feature value $Z_1^2$. Likewise, feature sum $C_1^{100}$ is accumulated in dependence upon feature sum $C_1^2$, feature value $f_1^{100}$, and feature value $z_1^{100}$. In implementations, feature sums of a first state vector $C_0$ can be initialized to zero, or to pre-trained values, or to values dependent on the feature values of an activation vector.

Regarding feature parallelism, for the current time series state vector $C_t$, the QRNN pooling layer 600 applies accumulators in parallel to concurrently accumulate feature sums for all the ordinal positions $$\bigvee_{j=1}^{j=d}$$

in the state vector $C_t$ in accordance with the mathematical formulation (4). Thus, in FIG. 6, feature sums $C_1^1, \ldots, C_1^{100}$ for state vector $C_1$ 802 for the first time series window are accumulated in parallel. Similarly, feature sums $C_2^1, \ldots, C_2^{100}$ for state vector $C_2$ for the second time series window are accumulated in parallel. Likewise, feature sums $C_m^1, \ldots, C_m^{100}$ for state vector $C_m$ 804 for the $m^{th}$ time series window are accumulated in parallel.

In addition, the QRNN pooling layer 600 sequentially outputs state vectors $C_1, \ldots, C_m$ for each successive time series window $$\bigvee_{t=1}^{t=m}$$

among the m time series windows.

Consider another example of feature parallelism in FIG. 7, which is based on ifo-pooling implemented by a multi-gate pooling layer 700. Note that the QRNN pooling layer 700 applies ifo-pooling "ordinal position-wise" using the following mathematical formulation:

$$\bigvee_{t=1}^{t=m} \bigvee_{j=1}^{j=d} c_t^j = f_t^j \cdot c_{t-1}^j + i_t^j \cdot z_t^j \quad (5)$$

where, the pair for all symbols indicate operations over two dimensions of a matrix and $$\bigvee_{t=1}^{t=m}$$

denotes operation over successive time series windows $$\bigvee_{j=1}^{j=d}$$

denotes operations over ordinal positions, which are parallelizable

- $C_t^j$ is the feature sum at the j ordinal position in the current state vector $C_t$
- $f_t^j$ is the feature value at the j ordinal position in the current forget gate vector $f_t$
- $C_{t-1}^j$ is the feature value at the j ordinal position in the previous state vector $C_{t-1}$
- $i_t^j$ is the feature value at the j ordinal position in the current input gate vector $i_t$
- $z_t^j$ is the feature value at the j ordinal position in the current activation vector $z_t$
- · denotes multiplication Mathematical formulation (5) involves computing a feature sum $C_t^j$ for a given ordinal position j in a state vector $C_t$ for a current time series window t in dependence upon: a feature sum $C_{t-1}^j$ at the same ordinal position j in a state vector $C_{t-1}$ for a previous time series window t−1, a feature value $f_t^j$ at the same ordinal position j in a forget gate vector $f_t$ for a current time series window t, a feature value $i_t^j$ at the same ordinal position j in an input gate vector $i_t$ for a current time series window t, and a feature value $z_t^j$ at the same ordinal position j in a forget gate vector $Z_t$ t for a current time series window t.

Therefore, anthropomorphically, in mathematical formulation (5), each feature value of a current forget gate vector controls ordinal position-wise accumulation of a respective feature sum from a previous state vector, and each feature value of a current input gate vector controls, ordinal position-wise, accumulation of a respective feature value from a current activation vector. Thus, in FIG. 7, feature sum $C_1^1$ is accumulated in dependence upon feature sum $C_0^1$, feature value $f_1^1$, feature value $i_1^1$, and feature value $Z_1^1$. Similarly, feature sum $C_1^2$ is accumulated in dependence upon feature sum $C_0^2$, feature value $f_1^2$, feature value $i_1^2$, and feature value $z_1^2$. Likewise, feature sum $C_1^{100}$ is accumulated in dependence upon feature sum $C_0^{100}$, feature value $f_1^{100}$, feature value $i_1^{100}$, and feature $z_1^{100}$. In implementations, feature sums of a first state vector $C_0$ can be initialized to zero, or to pre-trained values, or to values dependent on the feature values of an activation vector.

Regarding feature parallelism, for the current time series state vector $C_t$, the QRNN pooling layer 700 applies accumulators in parallel to concurrently accumulate feature sums for all the ordinal positions $$\bigvee_{j=1}^{j=d}$$

in the state vector $C_t$ in accordance with the mathematical formulation (5). Thus, in FIG. 7, feature sums $C_1^1, \ldots, C_1^{100}$ for state vector $C_1$ 802 for the first time series window are accumulated in parallel. Similarly, feature sums $C_2^1, \ldots, C_2^{100}$ for state vector $C_2$ for the second time series window are accumulated in parallel. Likewise, feature sums $C_m^1, \ldots, C_m^{100}$ for state vector $C_m$ 804 for the $m^{th}$ time series window are accumulated in parallel.

In addition, the QRNN pooling layer 700 sequentially outputs state vectors $C_1, \ldots, C_m$ for each successive time series window $$\bigvee_{t=1}^{t=m}$$

among the m time series windows.

A single QRNN pooling layer thus performs an input-dependent pooling, followed by a gated linear combination of convolutional features. Although recurrent parts of the QRNN pooling functions are calculated by the QRNN pooling layers for each timestep in an input sequence, QRNN pooling layers' parallelism along feature dimensions means that, in practice, implementing the QRNN pooling functions over long input sequences requires a negligible amount of computation time.

In one implementation, the QRNN is regularized by requiring a random subset of feature sums at given ordinal positions in the state vector for the current time series window to replicate respective feature sums at the given ordinal positions in the state vector concurrently accumulated for the prior time series window. This is achieved by requiring respective feature values at the given ordinal positions in a forget gate vector for the current time series window to be unity.

QRNN Encoder-Decoder Model

FIG. 9 is one implementation of a QRNN encoder-decoder model 900 that increases computational efficiency in neural network sequence-to-sequence modeling. Model 900 includes a QRNN encoder and a QRNN decoder. The QRNN encoder comprises one or more encoder convolutional layers (like 902, 906) and one or more one encoder pooling layers (like 904, 908). At least one encoder convolutional layer (like 902) receives a time series of encoder input vectors and concurrently outputs encoded convolutional vectors for time series windows. Also, at least one encoder pooling layer (like 904 or 908) receives the encoded convolutional vectors for the time series windows, concurrently accumulates an ordered set of feature sums in an encoded state vector for a current time series window, and sequentially outputs an encoded state vector (like 922a, 922b, or 922c) for each successive time series window among the time series windows.

The QRNN decoder comprises one or more decoder convolutional layers (like 914, 918) and one or more one decoder pooling layers (like 916, 920). At least one decoder convolutional layer (like 914) receives a time series of decoder input vectors and concurrently outputs decoded convolutional vectors for time series windows. At least one decoder pooling layer (like 916 or 920) receives the decoded convolutional vectors (like 915a, 915b, 915c) for the time series windows respectively concatenated with an encoded state vector (like 910 or 912) outputted by an encoder pooling layer (like 904 or 908) for a final time series window, concurrently accumulates an ordered set of feature sums in a decoded state vector for a current time series window, and sequentially outputs a decoded state vector (like 924a, 924b, or 924c) for each successive time series window among the time series windows. Thus, the output of each decoder QRNN layer's convolution functions is supplemented at every timestep with the final encoder hidden state. This is accomplished by adding the result of the convolution for layer l (e.g., $W_z^l * X^l$, in $\mathbb{R}^{T \times m}$) with broadcasting to a linearly projected copy of layer l's last encoder state (e.g., $V_z^l \tilde{h}_T^l$, in $\mathbb{R}^m$) (like 910 or 912).

Activation vectors and the gate vectors for the QRNN encoder-decoder model 900 are defined by the following mathematical formulation:

$$Z^l = \tan h(W_z^l * X^l + V_z^l \tilde{h}_T^l)$$

$$F^l = \sigma(W_f^l * X^l + V_f^l \tilde{h}_T^l)$$

$$O^l = \sigma(W_O^l * X^l + V_O^l \tilde{h}_T^l)$$

where the tilde denotes that $\tilde{h}$ is an encoder variable.

Then, a state comparator calculates linguistic similarity (e.g., using dot product or inner product or bilinear product) between the encoded state vectors (like 922a, 922b, or 922c) and the decoded state vectors (like 924a, 924b, or 924c) to produce an affinity matrix 926 with encoding-wise and decoding-wise axes. Next, an exponential normalizer 928, such as softmax, normalizes the affinity matrix 926 encoding-wise to produce respective encoding-to-decoding attention weights $\alpha_{st}$, defined as:

$$\alpha_{st} = \text{softmax}(C_t^L \cdot \tilde{h}_s^L)$$

Then, an encoding mixer respectively combines the encoded state vectors (like 922*a*, 922*b*, or 922*c*) with the encoding-to-decoding attention weights to generate respective contextual summaries $k_t$ of the encoded state vectors, defined as:

$$k_t = \sum_s \alpha_{st} \tilde{h}_s^L$$

Finally, an attention encoder respectively combines the decoded state vectors (like 924*a*, 924*b*, or 924*c*) with the respective contextual summaries of the encoded state vectors to produce an attention encoding for each of the time series windows. In one implementation, the attention encoder is a multilayer perceptron that projects a concatenation of the decoded state vectors and respective contextual summaries of the encoded state vectors into non-linear projections to produce an attention encoding for each of the time series windows.

In some implementations, the encoded state vectors (like 922*a*, 922*b*, or 922*c*) are respectively multiplied by output gate vectors of the encoded convolutional vectors to produce respective encoded hidden state vectors. In such implementations, the state comparator calculates linguistic similarity (e.g., using dot product or inner product or bilinear product) between the encoded hidden state vectors and the decoded state vectors to produce an affinity matrix with encoding-wise and decoding-wise axes. Also, in such implementations, the encoding mixer respectively combines the encoded hidden state vectors with the encoding-to-decoding attention weights to generate respective contextual summaries of the encoded hidden state vectors. Further, in such implementations, the attention encoder respectively combines the decoded state vectors with the respective contextual summaries of the encoded hidden state vectors, and further multiplies the combinations with respective output gate vectors of the decoded convolutional vectors to produce an attention encoding for each of the time series windows. In one implementation, the attention encoder is a multilayer perceptron that projects a concatenation of the decoded state vectors and respective contextual summaries of the encoded hidden state vectors into non-linear projections, and further multiplies the non-linear projections 930 with respective output gate vectors 932 of the decoded convolutional vectors to produce an attention encoding for each of the time series windows, defined as:

$$h_t^L = o_t \odot (W_k k_t + W_c c_t^L)$$

where L is the last layer.

While the first step of the attention procedure is quadratic in the sequence length, in practice it takes significantly less computation time than the model's linear and convolutional layers due to the simple and highly parallel dot-product scoring function.

Other implementations of the technology disclosed include using normalizers different than, in addition to, and/or in combination with the exponential normalizer. Some examples include sigmoid based normalizers (e.g., multiclass sigmoid, piecewise ramp), hyperbolic tangent based normalizers, rectified linear unit (ReLU) based normalizers, identify based normalizers, logistic based normalizers, sine based normalizers, cosine based normalizers, unit sum based normalizers, and step based normalizers. Other examples include hierarchical softmax, differentiated softmax, importance sampling, noise contrastive estimation, negative sampling, gated softmax spherical softmax, Taylor softmax, and sparsemax. In yet other implementations, any other conventional or future-developed normalizer can be used.

Experimental Results

QRNN outperforms LSTM-based models of equal state vector size on three different natural language processing (NLP) tasks, namely, document-level sentiment classification, language modeling, and character-based neural network machine translation, while dramatically improving computation speed.

FIG. 10 is a table that shows accuracy comparison of the QRNN on sentiment classification task for a popular document-level sentiment classification benchmark, the IMDb movie review dataset. The dataset consists of a balanced sample of 25,000 positive and 25,000 negative reviews, divided into equal-size train and test sets, with an average document length of 231 words. In one implementation, a QRNN having a four-layer densely connected architecture with 256 units per layer and word vectors initialized using 300-dimensional cased GloVe embeddings achieves best performance on a held-out development.

FIG. 11 shows one implementation of visualization of hidden state vectors of the final QRNN layer on part of an example from the IMDb dataset, with timesteps along the vertical axis. Even without any post-processing, changes in the hidden state are visible and interpretable in regards to the input. This is a consequence of the elementwise nature of the recurrent pooling function, which delays direct interaction between different channels of the hidden state until the computation of the next QRNN layer.

In FIG. 11, colors denote neuron activations. After an initial positive statement "This movie is simply gorgeous" (off graph at timestep 9), timestep 117 triggers a reset of most hidden states due to the phrase "not exactly a bad story" (soon after "main weakness is its story"). Only at timestep 158, after "I recommend this movie to everyone, even if you've never played the game", do the hidden units recover.

FIG. 12 depicts a table that shows accuracy comparison of the QRNN on language modeling task. The experiment uses a standard preprocessed version of the Penn Treebank (PTB). FIG. 12 shows single model perplexity on validation and test sets for the Penn Treebank language modeling task. Lower is better. "Medium" refers to a two-layer network with 640 or 650 hidden units per layer. All QRNN models include dropout of 0.5 on embeddings and between layers, in some implementations. MC refers to Monte Carlo dropout averaging at test time.

As shown in FIG. 12, the QRNN strongly outperforms different types of LSTMs. This is due to the efficient computational capacity that the QRNN's pooling layer has relative to the LSTM's recurrent weights, which provide structural regularization over the recurrence.

FIG. 13 is a table that shows accuracy comparison of the QRNN on language translation task. The QRNN encoder-decoder model is evaluated on a challenging neural network machine translation task, IWSLT GermanEnglish spoken-domain translation, applying fully character-level segmentation. This dataset consists of 209,772 sentence pairs of parallel training data from transcribed TED and TEDx presentations, with a mean sentence length of 103 characters for German and 93 for English.

The QRNN encoder-decoder model achieves best performance on a development set (TED.tst2013) using a four-layer encoderdecoder QRNN with 320 units per layer, no dropout or L2 regularization, and gradient rescaling to a maximum magnitude of 5. FIG. 13 shows that the QRNN encoder-decoder model outperforms the character-level LSTM, almost matching the performance of a word-level attentional baseline.

FIG. 14 depicts charts that show training speed and inference speed of the QRNN. In FIG. 14, the training speed for two-layer 640-unit PTB LM on a batch of 20 examples of 105 timesteps is shown on the left. "RNN" and "softmax" include the forward and backward times, while "optimization overhead" includes gradient clipping, L2 regularization, and SGD computations. On the right, FIG. 14 shows the inference speed advantage of a 320-unit QRNN layer over an equal-sized cuDNN LSTM layer for data with the given batch size and sequence length. Training results are similar.

Sample Code

The following sample code shows one implementation of the QRNN 100:

```
from chainer import cuda, Function, Variable, Chain
import chainer.links as L
import chainer.functions as F
import numpy as np
```

```
THREADS_PER_BLOCK = 32
class STRNNFunction(Function):
    def forward_gpu(self, inputs):
        f, z, hinit = inputs
        b, t, c = f.shape
        assert c % THREADS_PER_BLOCK == 0
        self.h = cuda.cupy.zeros((b, t + 1, c), dtype=np.float32)
        self.h[:, 0, :] = hinit
        cuda.raw('''
            #define THREADS_PER_BLOCK 32
            extern "C" __global__ void strnn_fwd(
                    const CArray<float, 3> f, const CArray<float, 3> z,
                    CArray<float, 3> h) {
                int index[3];
                const int t_size = f.shape( )[1];
                index[0] = blockIdx.x;
                index[1] = 0;
                index[2] = blockIdx.y * THREADS_PER_BLOCK + threadIdx.x;
                float prev_h = h[index];
                for (int i = 0; i < t_size; i++){
                    index[1] = i;
                    const float ft = f[index];
                    const float zt = z[index];
                    index[1] = i + 1;
                    float &ht = h[index];
                    prev_h = prev_h * ft + zt;
                    ht = prev_h;
                }
        }''', 'strnn_fwd')(
            (b, c // THREADS_PER_BLOCK), (THREADS_PER_BLOCK,),
            (f, z, self.h))
        return self.h[:, 1:, :],
    def backward_gpu(self, inputs, grads):
        f, z = inputs[:2]
        gh, = grads
        b, t, c = f.shape
        gz = cuda.cupy.zeros_like(gh)
        cuda.raw('''
            #define THREADS_PER_BLOCK 32
            extern "C" __global__ void strnn_back(
                    const CArray<float, 3> f, const CArray<float, 3> gh,
                    CArray<float, 3> gz) {
                int index[3];
                const int t_size = f.shape( )[1];
                index[0] = blockIdx.x;
                index[2] = blockIdx.y * THREADS_PER_BLOCK + threadIdx.x;
                index[1] = t_size - 1;
                float &gz_last = gz[index];
                gz_last = gh[index];
                float prev_gz = gz_last;
                for (int i = t_size - 1; i > 0; i--){
                    index[1] = i;
                    const float ft = f[index];
                    index[1] = i - 1;
                    const float ght = gh[index];
                    float &gzt = gz[index];
                    prev_gz = prev_gz * ft + ght;
                    gzt = prev_gz;
                }
        }''', 'strnn_back')(
            (b, c // THREADS_PER_BLOCK), (THREADS_PER_BLOCK,),
            (f, gh, gz))
        gf = self.h[:, :-1, :] * gz
        ghinit = f[:, 0, :] * gz[:, 0, :]
        return gf, gz, ghinit
def strnn(f, z, h0):
    return STRNNFunction( )(f, z, h0)
def attention_sum(encoding, query):
    alpha = F.softmax(F.batch_matmul(encoding, query, transb=True))
    alpha, encoding = F.broadcast(alpha[:, :, :, None],
            encoding[:, :, None, :])
    return F.sum(alpha * encoding, axis=1)
class Linear(L.Linear):
    def __call__(self, x):
        shape = x.shape
        if len(shape) == 3:
            x = F.reshape(x, (-1, shape[2]))
        y = super( ).__call__(self, x)
        if len(shape) == 3:
            y = F.reshape(y, shape)
        return y
class QRNNLayer(Chain):
    def __init_(self, in_size, out_size, kernel_size=2, attention=False,
            decoder=False):
        if kernel_size == 1:
            super( ).__init_(W=Linear(in_size, 3 * out_size))
        elif kernel_size == 2:
            super( ).__init_(W=Linear(in_size, 3 * out_size, nobias=True),
                V=Linear(in_size, 3 * out_size))
        else:
            super( ).__init_(
                conv=L.ConvolutionND(1, in_size, 3 * out_size, kernel_size,
                    stride=1, pad=kernel_size - 1))
        if attention:
            self.add_link('U', Linear(out_size, 3 * in_size))
            self.add_link('o', Linear(2 *out_size, out_size))
        self.in_size, self.size, self.attention = in_size, out_size, attention
        self.kernel_size = kernel_size
    def pre(self, x):
        dims = len(x.shape) - 1
        if self.kernel_size == 1:
            ret = self.W(x)
        elif self.kernel_size == 2:
            if dims == 2:
                xprev = Variable(
                    self.xp.zeros((self.batch_size, 1, self.in_size),
                        dtype=np.float32), volatile='AUTO')
                xtminus1 = F.concat((xprev, x[:, :-1, :]), axis=1)
            else:
                xtminus1 = self.x
            ret = self.W(x + self.V(xtminus1))
        else:
            ret = F.swapaxes(self.conv(
                F.swapaxes(x, 1, 2))[:, :, :x.shape[2]], 1, 2)
        if not self.attention:
            return ret
        if dims == 1:
            enc = self.encoding[:, -1,:]
        else:
            enc = self.encoding[:, -1:, :]
        return sum(F.broadcast(self.U(enc), ret))
    def init(self, encoder_c=None, encoder_h=None):
        self.encoding = encoder_c
```

-continued

```
    self.c, self.x = None, None
    if self.encoding is not None:
        self.batch_size = self.encoding.shape[0]
        if not self.attention:
            self.c = self.encoding[:, -1, :]
        if self.c is None or self.c.shape[0] < self.batch_size:
            self.c = Variable(self.xp.zeros((self.batch_size, self.size),
                dtype=np.float32), volatile='AUTO')
        if self.x is None or self.x.shape[0] < self.batch_size:
            self.x = Variable(self.xp.zeros((self.batch_size, self.in_size),
                dtype=np.float32), volatile='AUTO')
def _call_(self, x):
    if not hasattr(self, 'encoding') or self.encoding is None:
        self.batch_size = x.shape[0]
        self.init( )
    dims = len(x.shape) - 1
    f, z, o = F.split_axis(self.pre(x), 3, axis=dims)
    f = F.sigmoid(f)
    z = (1 - f) * F.tanh(z)
    o = F.sigmoid(o)
    if dims == 2:
        self.c = strnn(f, z, self.c[:self.batch_size])
    else:
        self.c = f * self.c + z
    if self.attention:
        context = attention_sum(self.encoding, self.c)
        self.h = o * self.o(F.concat((self.c, context), axis=dims))
    else:
        self.h = self.c * o
    self.x = x
    return self.h
def get_state(self):
    return F.concat((self.x, self.c, self.h), axis=1)
def set_state(self, state):
    self.x, self.c, self.h = F.split_axis(
        state, (self.in_size, self.in_size + self.size), axis=1)
state = property(get_state, set_state)
```

Computer System

FIG. 15 is a simplified block diagram of a computer system 1500 that can be used to implement the QRNN 100. Computer system 1500 typically includes one or more CPU processors 1520 that communicate with a number of peripheral devices via bus subsystem 1532. These peripheral devices can include a memory subsystem 1512 including, for example, memory devices and a file storage subsystem 1518, user interface input devices 1530, user interface output devices 1524, a network interface subsystem 1522, and a GPU 1526 with multiple GPU processing cores or GPU processors 1528. The input and output devices allow user interaction with computer system 1500. Network interface subsystem 1522 provides an interface to outside networks, including an interface to corresponding interface devices in other computer systems.

The convolutional and pooling operations of the QRNN 100 are performed by the GPU processing cores 1528, according to some implementations. In one implementation, the accumulators, which operate in parallel to concurrently output feature sums of a state vector, are simultaneously run on individual GPU processing cores 1528. Thus each GPU processor calculates a feature sum for a given ordinal position in a state vector, and a set of GPU processors execute in parallel to concurrently calculate all the feature sums for all the ordinal positions of the vector. Accordingly, the QRNN 100 improves the computational efficiency of the GPU 1526.

User interface input devices 1530 or clients or client devices can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1500.

User interface output devices 1524 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1500 to the user or to another machine or computer system.

Storage subsystem 1510 stores programming and data constructs that provide the functionality of some or all of the modules and methods described herein. These software modules are generally executed by CPU processors 1520 alone or in combination with other processors like GPU processors 1528.

Memory subsystem 1512 in the storage subsystem can include a number of memories including a main random access memory (RAM) 1516 for storage of instructions and data during program execution and a read only memory (ROM) 1514 in which fixed instructions are stored. A file storage subsystem 1518 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1518 or the memory subsystem 1512, or in other machines accessible by the processor.

Bus subsystem 1532 provides a mechanism for letting the various components and subsystems of computer system 1500 communicate with each other as intended. Although bus subsystem 1532 is shown schematically as a single bus, alternative implementations of the bus subsystem can use multiple busses. In some implementations, an application server (not shown) can be a framework that allows the applications of computer system 1500 to run, such as the hardware and/or software, e.g., the operating system.

Computer system 1500 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1500 depicted in FIG. 15 is intended only as a specific example for purposes of illustrating the preferred embodiments of the present invention. Many other configurations of computer system 1500 are possible having more or less components than the computer system depicted in FIG. 15.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method for generating an output from a quasi-recurrent neural network (QRNN), the method including:
    receiving a time series of input vectors;
    passing the time series of input vectors to a plurality of QRNN layers, each QRNN layer including a respective convolution layer and a respective pooling layer;
    generating, by each respective convolution layer, an activation vector from the input vectors through a hyperbolic tangent nonlinearity activation and one or more gate vectors though a convolutional filter bank;
    applying, by each respective pooling layer, a QRNN fo-pooling operation to the one or more gate vectors by:
    computing a current state vector based on a current forget gate vector from the one or more gate vectors, a previous state vector and the activation vector, and
    computing a current hidden state vector by taking an elementwise multiplication of an output gate vector from the one or more gate vectors and the computed current state vector;
    passing the computed current hidden state vector to a next QRNN layer from the plurality of QRNN layer; and
    sequentially outputting an encoded hidden state vector from a last QRNN layer of the plurality of QRNN layers for each successive time series window among a plurality of times series windows corresponding to the time series of input vectors.

2. The method of claim 1, wherein the one or more gate vectors correspond to a dimensionality that is augmented relative to dimensionality of the input vectors in dependence upon a number of convolutional filters in the convolutional filter bank.

3. The method of claim 1, wherein the input vectors represent elements of an input sequence selected from the group consisting of a word-level sequence and a character-level sequence.

4. The method of claim 1, wherein the one or more gate vectors comprises a forget gate vector, and
    wherein the respective pooling layer uses a forget gate vector for a current time series window to control accumulation of information from the previous state vector accumulated for a prior time series window and information from an activation vector for the current time series window.

5. The method of claim 1, wherein the one or more gate vectors comprises an input gate vector, and
    wherein the respective pooling layer uses an input gate vector for a current time series window to control accumulation of information from an activation vector for the current time series window.

6. The method of claim 1, wherein the one or more gate vectors comprises an output gate vector, and
    wherein the pooling layer uses an output gate vector for a current time series window to control accumulation of information from the current state vector for the current time series window.

7. The method of claim 1, further comprising:
    receiving as input a preceding output generated by a preceding QRNN layer of the plurality of QRNN layers;
    processing the preceding output through the respective convolutional layer to produce an alternative representation of the preceding output; and
    processing the alternative representation through the respective pooling layer to produce an output.

8. The method of claim 1, further comprising:
    including skip connections between the plurality of QRNN layers,
    wherein the skip connections concatenate output of a preceding QRNN layer with output of a current QRNN layer and provide a concatenation to a following layer as input.

9. The method of claim 1, wherein the activation vector is generated by the respective convolutional layer by:
    applying the convolutional filter bank to a number of time series windows that are aligned in parallel, corresponding to the time series of the input vectors;
    concurrently outputting convolutional vectors in parallel corresponding to the number of the time series windows from the convolutional filter bank,
    each of the convolution vectors comprising feature values in an activation vector and in one or more gate vectors, and
    the feature values in the gate vectors are parameters that, respectively, apply element-wise by ordinal position to the feature values in the activation vector.

10. The method of claim 9, wherein the current state vectors are generated by:
    applying accumulators in parallel over feature values of a convolutional vector to concurrently accumulate ordinal position-wise, in the current state vector for a current time series window, an ordered set of feature sums for all ordinal positions in the current state vector in dependence upon a feature value at a given ordinal position in an activation vector outputted for the current time series window,
    one or more feature values at the given ordinal position in one or more gate vectors outputted for the current time series window, and
    a feature sum at the given ordinal position in the previous state vector accumulated for a prior time series window; and
    sequentially outputting the current state vector for each successive time series window among the time series windows.

11. A system of a quasi-recurrent neural network (QRNN), the system including:
    a memory storing parameters of the QRNN comprising an input layer, a plurality of QRNN layers and an output layer, and a plurality of processor-executable instructions; and
    one or more processor executing the plurality of processor-executable instructions to perform operations comprising:
    receiving at the input layer a time series of input vectors;
    generating, at each respective convolution layer comprised in each QRNN layer, an activation vector from the input vectors through a hyperbolic tangent nonlinearity activation and one or more gate vectors though a convolutional filter bank,
    applying, at each respective pooling layer comprised in the each QRNN layer, a QRNN fo-pooling operation to the one or more gate vectors by:
    computing a current state vector based on a current forget gate vector from the one or more gate vectors, a previous state vector and the activation vector, and
    computing a current hidden state vector by taking an elementwise multiplication of an output gate vector from the one or more gate vectors and the computed current state vector;

wherein the respective QRNN layer passes the computed current hidden state vector to a next QRNN layer from the plurality of QRNN layer; and sequentially outputs, at the output layer, an encoded hidden state vector from a last QRNN layer of the plurality of QRNN layers for each successive time series window among a plurality of times series windows corresponding to the time series of input vectors.

12. The system of claim 11, wherein the one or more gate vectors correspond to a dimensionality that is augmented relative to dimensionality of the input vectors in dependence upon a number of convolutional filters in the convolutional filter bank.

13. The system of claim 11, wherein the input vectors represent elements of an input sequence selected from the group consisting of a word-level sequence and a character-level sequence.

14. The system of claim 11, wherein the one or more gate vectors comprises a forget gate vector, and wherein the respective pooling layer uses a forget gate vector for a current time series window to control accumulation of information from the previous state vector accumulated for a prior time series window and information from an activation vector for the current time series window.

15. The system of claim 11, wherein the one or more gate vectors comprises an input gate vector, and wherein the respective pooling layer uses an input gate vector for a current time series window to control accumulation of information from an activation vector for the current time series window.

16. The system of claim 11, wherein the one or more gate vectors comprises an output gate vector, and wherein the pooling layer uses an output gate vector for a current time series window to control accumulation of information from the current state vector for the current time series window.

17. The system of claim 11, wherein each QRNN layer in the plurality of QRNN layers receives as input a preceding output generated by a preceding QRNN layer of the plurality of QRNN layers, processes the preceding output through the respective convolutional layer to produce an alternative representation of the preceding output, and processes the alternative representation through the respective pooling layer to produce an output.

18. The system of claim 11, wherein the plurality of QRNN layers include skip connections between layers, and the skip connections concatenate output of a preceding QRNN layer with output of a current QRNN layer and provide a concatenation to a following layer as input.

19. The system of claim 11, wherein the activation vector is generated by the respective convolutional layer by:

applying the convolutional filter bank to a number of time series windows that are aligned in parallel, corresponding to the time series of the input vectors;

concurrently outputting convolutional vectors in parallel corresponding to the number of the time series windows from the convolutional filter bank, each of the convolution vectors comprising feature values in an activation vector and in one or more gate vectors, and the feature values in the gate vectors are parameters that, respectively, apply element-wise by ordinal position to the feature values in the activation vector.

20. A non-transitory processor-readable medium storing processor-executable instructions for generating an output from a quasi-recurrent neural network (QRNN), the instructions executable by a processor to perform operations comprising:

receiving a time series of input vectors;

passing the time series of input vectors to a plurality of QRNN layers, each QRNN layer including a respective convolution layer and a respective pooling layer;

generating, by each respective convolution layer, an activation vector from the input vectors through a hyperbolic tangent nonlinearity activation and one or more gate vectors though a convolutional filter bank;

applying, by each respective pooling layer, a QRNN fo-pooling operation to the one or more gate vectors by:

computing a current state vector based on a current forget gate vector from the one or more gate vectors, a previous state vector and the activation vector, and computing a current hidden state vector by taking an elementwise multiplication of an output gate vector from the one or more gate vectors and the computed current state vector;

passing the computed current hidden state vector to a next QRNN layer from the plurality of QRNN layer; and sequentially outputting an encoded hidden state vector from a last QRNN layer of the plurality of QRNN layers for each successive time series window among a plurality of times series windows corresponding to the time series of input vectors.

* * * * *